US012561183B2

(12) United States Patent
Ghiglino

(10) Patent No.: US 12,561,183 B2
(45) Date of Patent: Feb. 24, 2026

(54) PARALLEL DATA PROCESSING IN EMBEDDED SYSTEMS

(71) Applicant: Klepsydra Technologies GmbH,
Zurich (CH)

(72) Inventor: Pablo Ghiglino, Zurich (CH)

(73) Assignee: Klepsydra Technologies GmbH,
Zurich (CH)

( * ) Notice: Subject to any disclaimer, the term of this
patent is extended or adjusted under 35
U.S.C. 154(b) by 393 days.

(21) Appl. No.: 17/753,715

(22) PCT Filed: Sep. 11, 2020

(86) PCT No.: PCT/EP2020/075540
§ 371 (c)(1),
(2) Date: Mar. 11, 2022

(87) PCT Pub. No.: WO2021/048401
PCT Pub. Date: Mar. 18, 2021

(65) Prior Publication Data
US 2022/0342722 A1      Oct. 27, 2022

(30) Foreign Application Priority Data

Sep. 13, 2019    (CH) ....................................... 1155/19

(51) Int. Cl.
*G06F 9/52* (2006.01)
*G06F 9/48* (2006.01)
(Continued)

(52) U.S. Cl.
CPC ................ *G06F 9/522* (2013.01); *G06F 9/48*
(2013.01); *G06F 9/4806* (2013.01);
(Continued)

(58) Field of Classification Search
CPC ........ G06F 9/48; G06F 9/4806; G06F 9/4843;
G06F 9/4881; G06F 9/50; G06F 9/5005;
(Continued)

(56) References Cited

U.S. PATENT DOCUMENTS

| | | | | |
|---|---|---|---|---|
| 2009/0144228 A1* | 6/2009 | Duffy | ................ | G06F 16/90339 707/E17.14 |
| 2010/0074106 A1* | 3/2010 | Chou | .................. | H04L 12/4637 370/229 |

(Continued)

OTHER PUBLICATIONS

Ingles et al, "A Simple Multithreaded C++ Framework for High-Performance Data Acquisition Systems", Proceedings of the 22nd International Conference "Mixed Design of Integrated Circuits and Systems", Jun. 25-27, 2015, pp. 153-157 (Year: 2015).*

(Continued)

*Primary Examiner* — Charles M Swift
(74) *Attorney, Agent, or Firm* — Gerald W. Roberts; John V. Daniluck; Dentons Bingham Greenebaum LLP

(57) ABSTRACT

The invention claims a computer-implemented method of lock-free parallel data processing in autonomous embedded systems comprising: one or more producer providing data, a Smart Object Pool, an asynchronous publisher object capable of cloning event objects, a circular batching queue, an event object handler, and a subscriber being arranged for sending the event objects to one or more consumers and for returning the event object to the smart object pool once it determines that no more consumer needs the event.

14 Claims, 25 Drawing Sheets

(51) Int. Cl.
 *G06F 9/50* (2006.01)
 *G06F 9/54* (2006.01)
(52) U.S. Cl.
 CPC .......... *G06F 9/4843* (2013.01); *G06F 9/4881*
 (2013.01); *G06F 9/50* (2013.01); *G06F*
 *9/5005* (2013.01); *G06F 9/5016* (2013.01);
 *G06F 9/5022* (2013.01); *G06F 9/54*
 (2013.01); *G06F 9/542* (2013.01); *G06F*
 *9/544* (2013.01)
(58) Field of Classification Search
 CPC ........ G06F 9/5016; G06F 9/5022; G06F 9/52;
 G06F 9/522; G06F 9/54; G06F 9/542;
 G06F 9/544
 See application file for complete search history.

(56) References Cited

U.S. PATENT DOCUMENTS

2013/0198419 A1\* 8/2013 Jones ........................ G06F 9/52
 710/54
2017/0060887 A1\* 3/2017 Murphy ................ G06F 16/162

OTHER PUBLICATIONS

Fang et al, Modeling and Analysis of the Disruptor Framework in CSP, 2018, IEEE, pp. 803-809 (Year: 2018).\*
Thompson et al, "Disruptor: High performance alternative to bounded queues for exchange data between concurrent threads", LMAX, May 2011, pp. 1-11 (Year: 2011).\*

\* cited by examiner

Fig. 2. Sensor Multiplexer

Fig. 3. Event loop

Fig. 7. CPU usage comparison by data rate.

Fig. 8. RAM usage comparison by data rate.

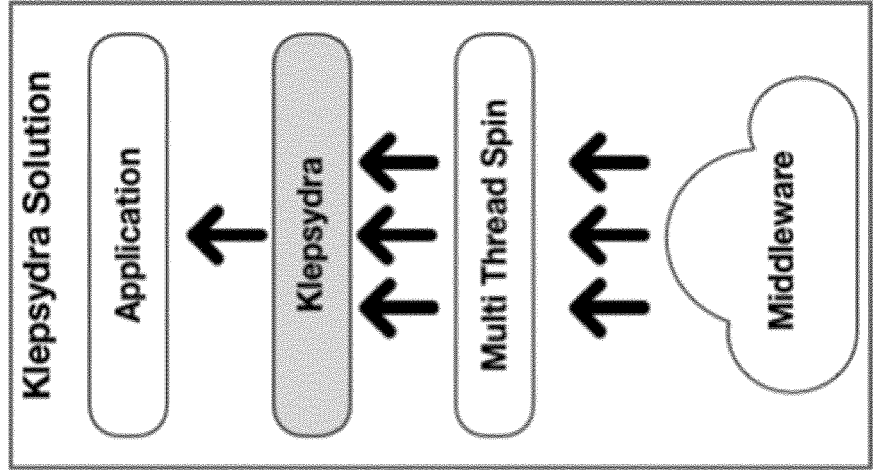
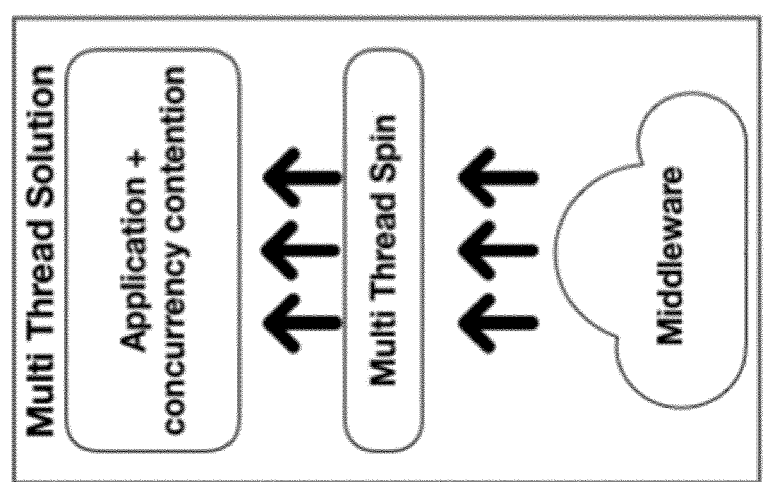
Fig. 10. Parallel data processing approaches.

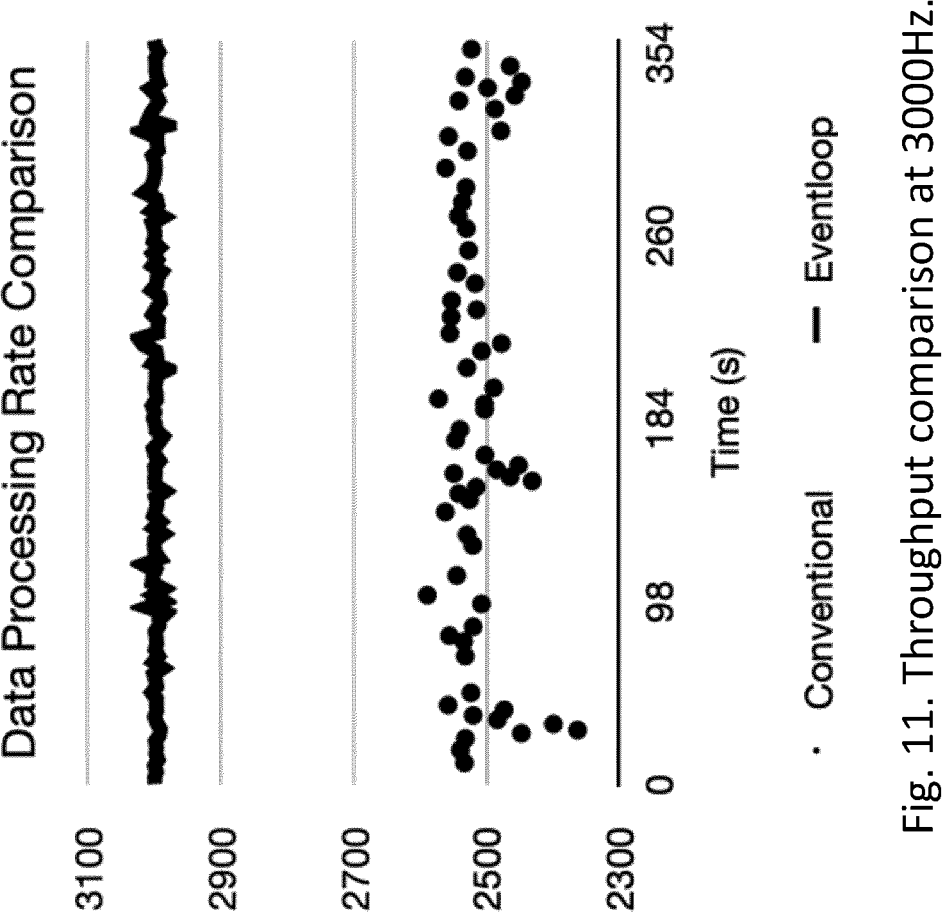
Fig. 11. Throughput comparison at 3000Hz.

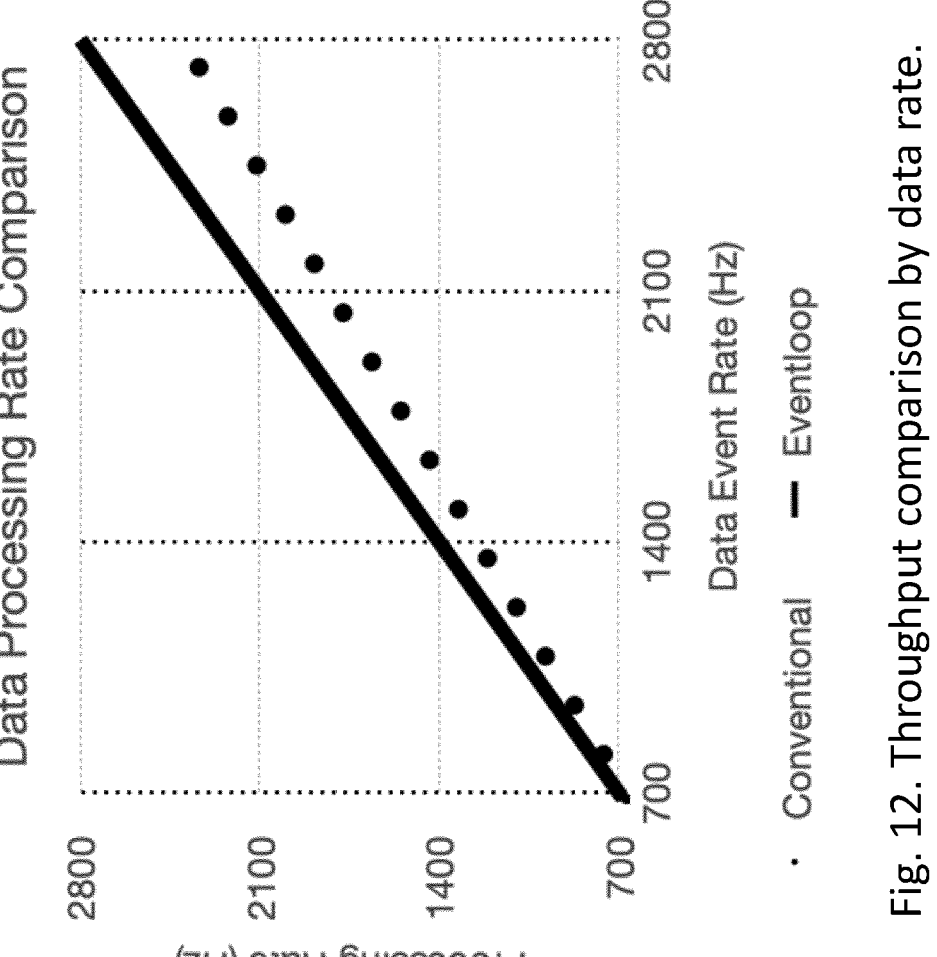
Fig. 12. Throughput comparison by data rate.

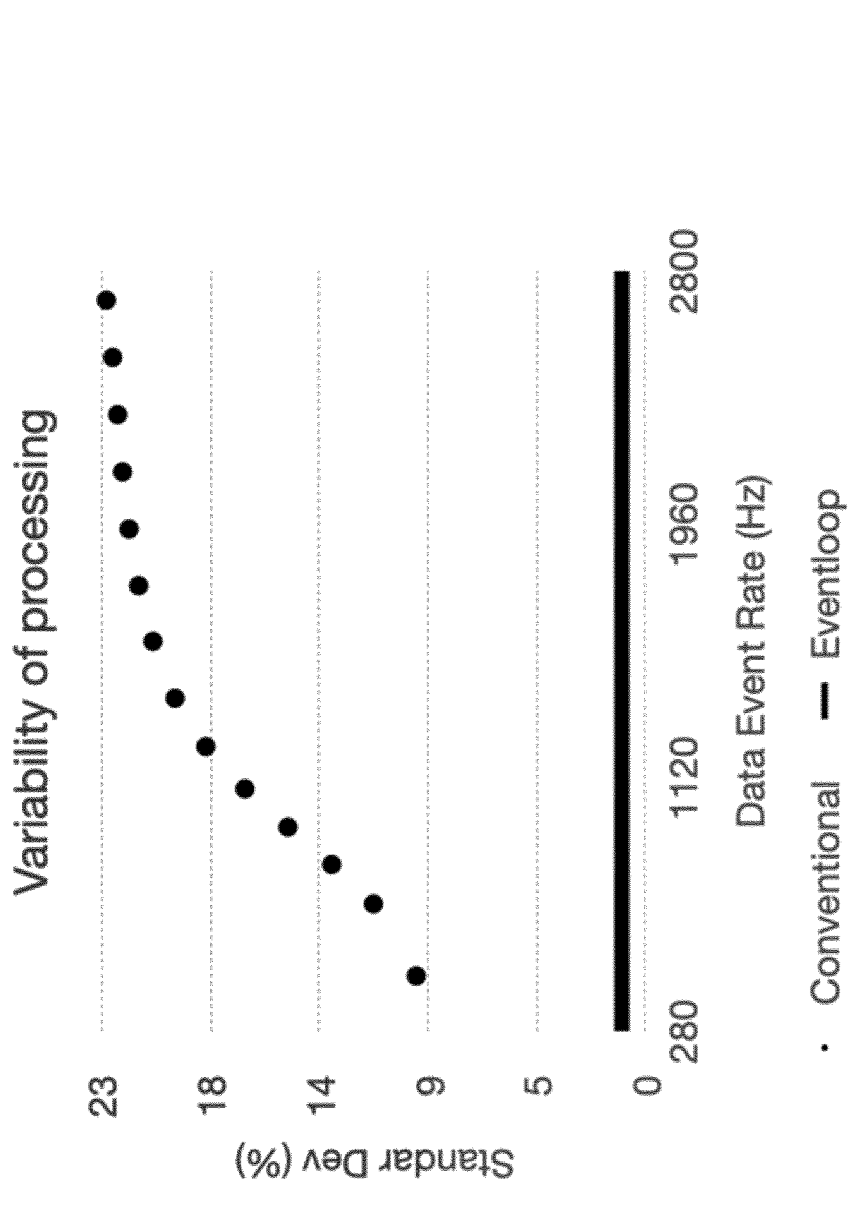
Fig. 13. Standard deviation for processing time comparison by data rate.

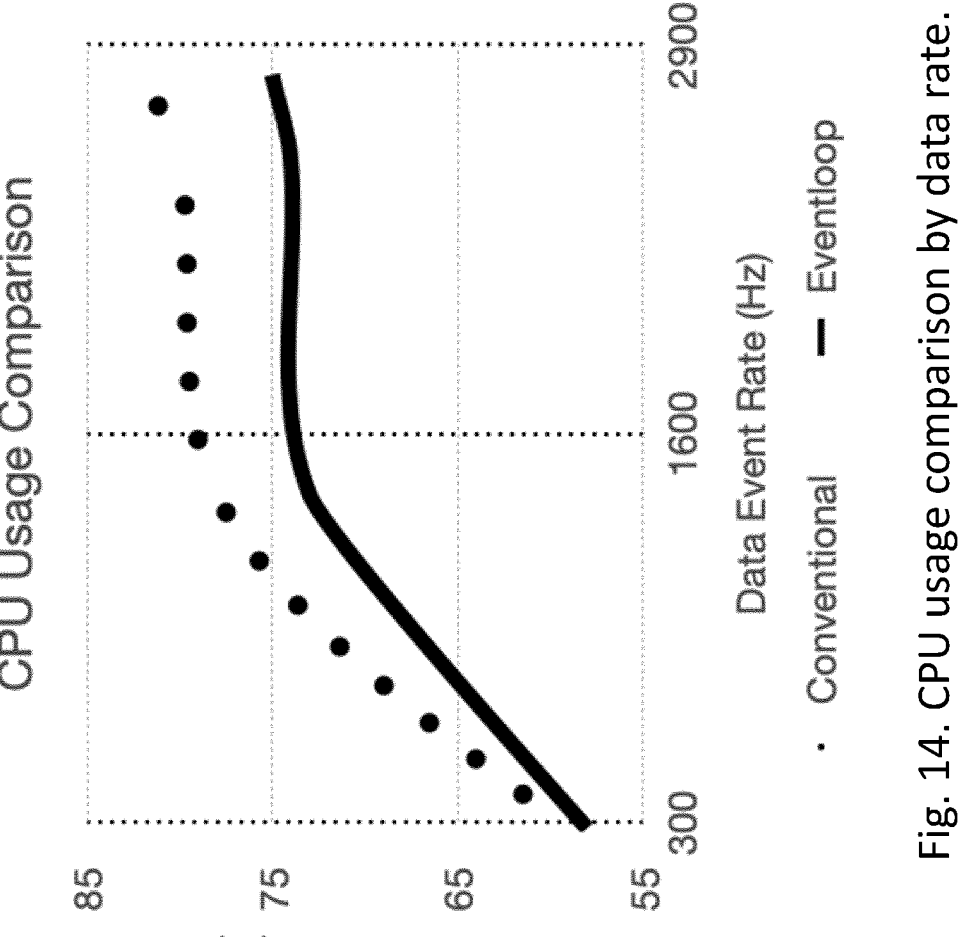
Fig. 14. CPU usage comparison by data rate.

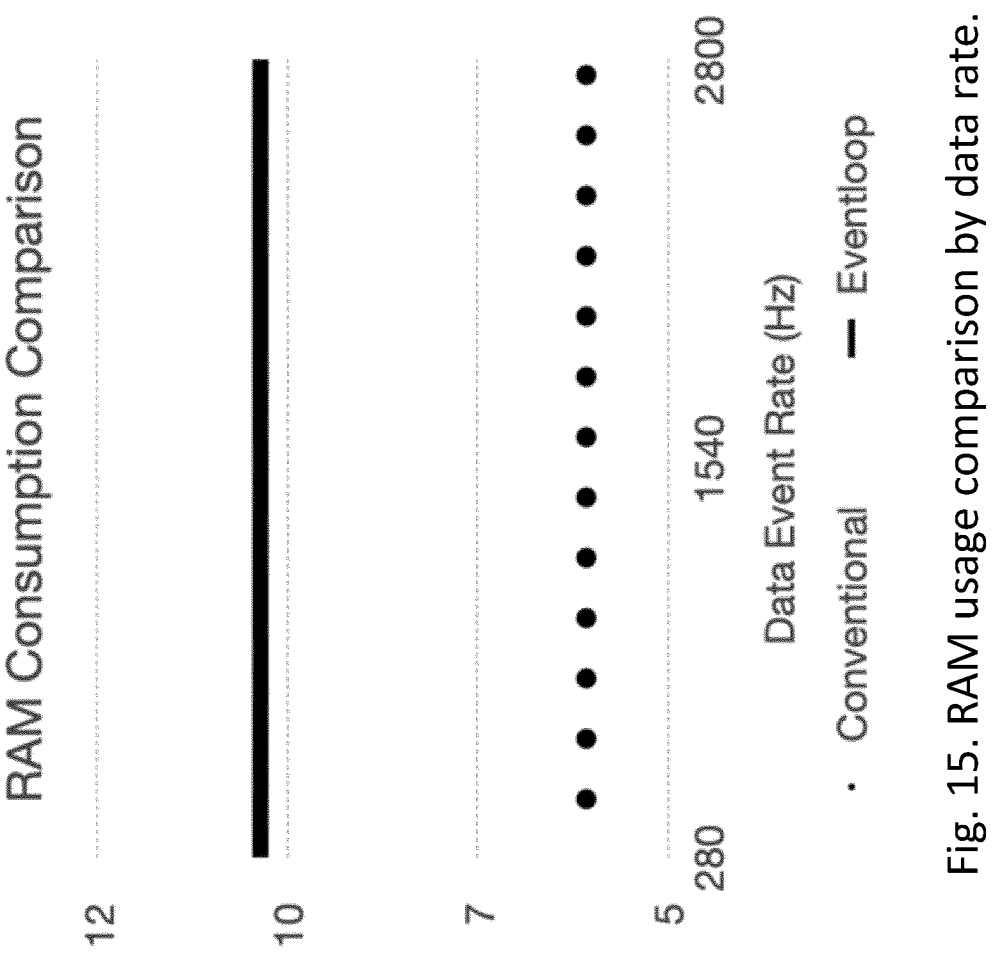
Fig. 15. RAM usage comparison by data rate.

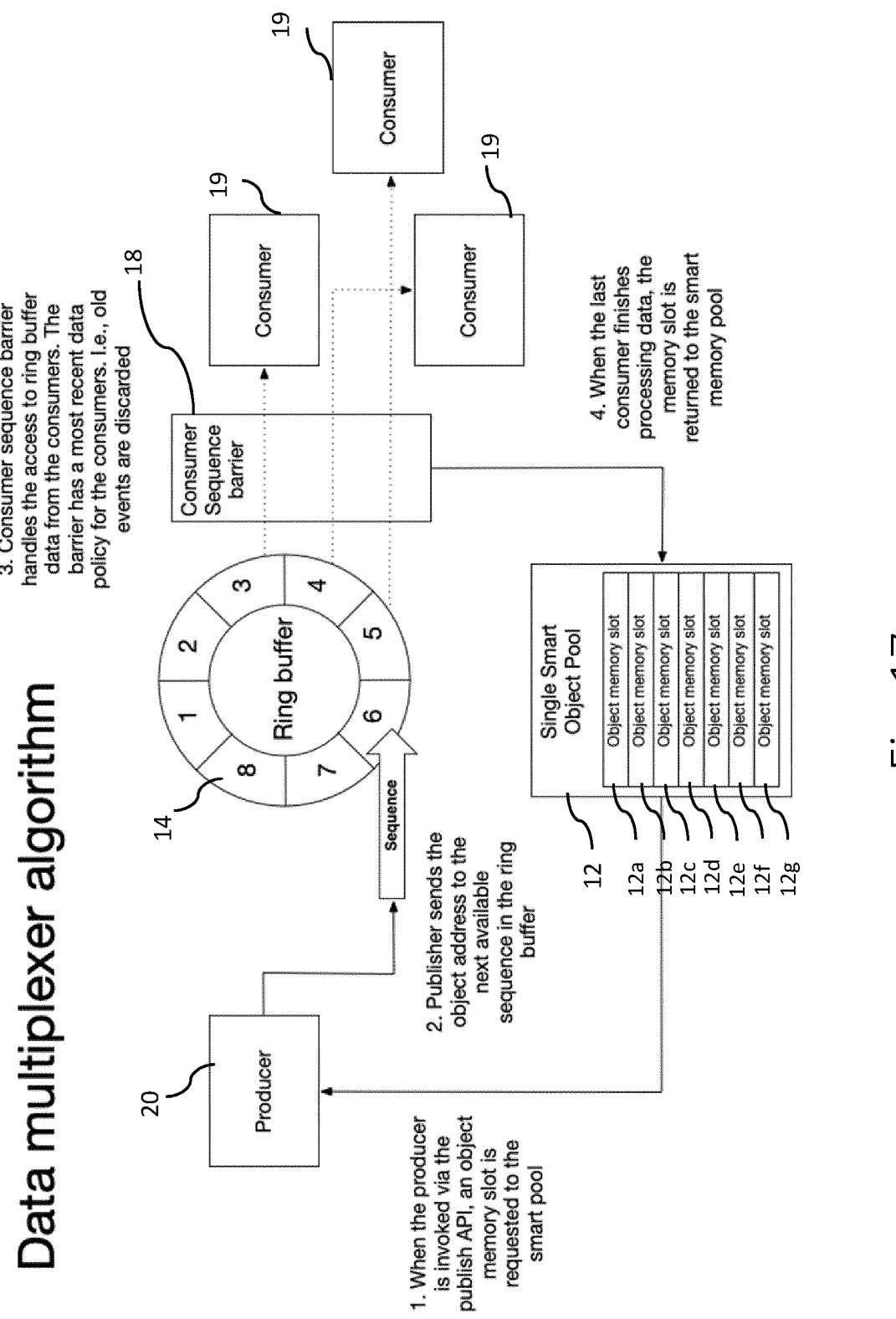

Data multiplexer algorithm

3. Consumer sequence barrier handles the access to ring buffer data from the consumers. The barrier has a most recent data policy for the consumers. I.e., old events are discarded 4. When the last consumer finishes processing data, the memory slot is returned to the smart memory pool 2. Publisher sends the object address to the next available sequence in the ring buffer 1. When the producer is invoked via the publish API, an object memory slot is requested to the smart pool

Fig. 17

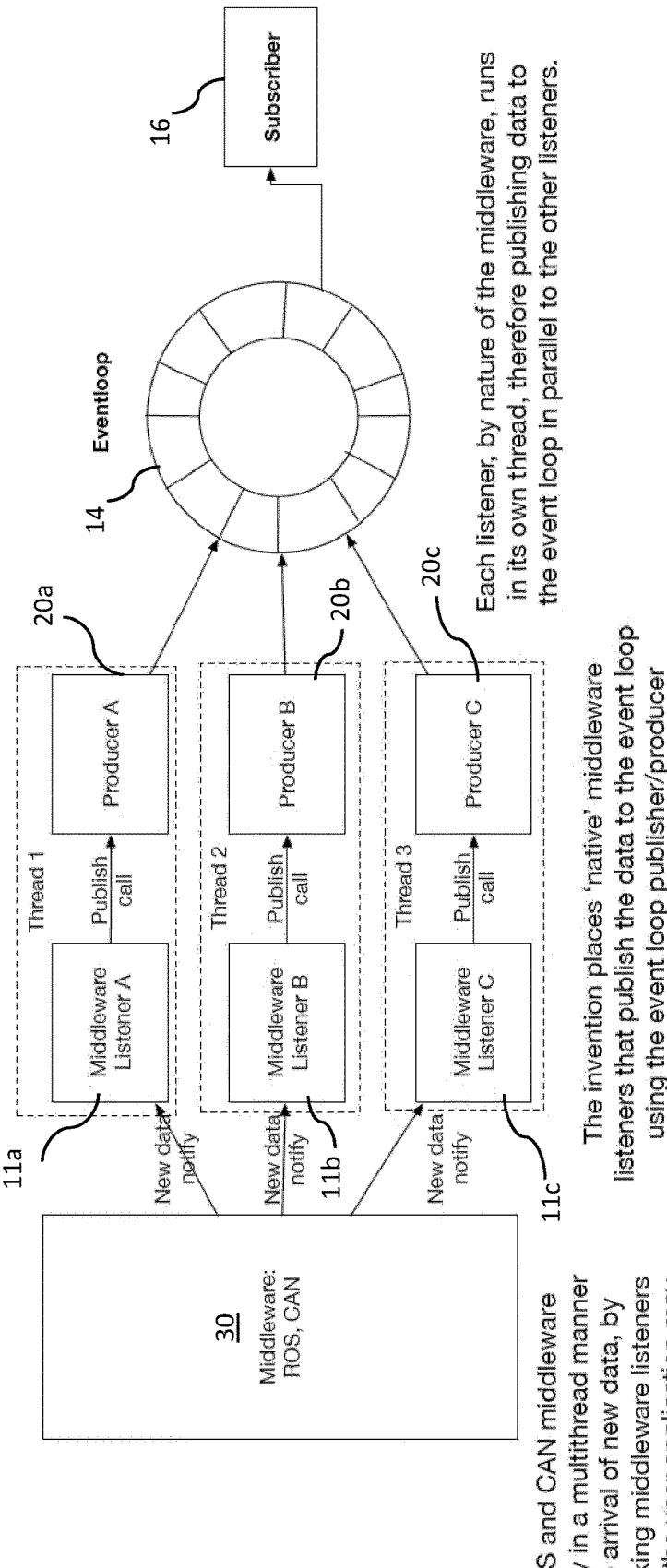

Middleware to Eventloop

Thread 1

Middleware Listener A — Publish call → Producer A    11a    20a

Thread 2

Middleware Listener B — Publish call → Producer B    11b    20b

Thread 3

Middleware Listener C — Publish call → Producer C    11c    20c

New data notify

30
Middleware: ROS, CAN

14    Eventloop

16    Subscriber

Each listener, by nature of the middleware, runs in its own thread, therefore publishing data to the event loop in parallel to the other listeners.

The invention places 'native' middleware listeners that publish the data to the event loop using the event loop publisher/producer ROS and CAN middleware notify in a multithread manner the arrival of new data, by invoking middleware listeners that the user application may register.

Fig. 24

PARALLEL DATA PROCESSING IN EMBEDDED SYSTEMS

FIELD OF THE INVENTION

The present invention concerns a method for lock-free parallel data processing adapted for use with embedded systems.

DESCRIPTION OF RELATED ART

New generations of autonomous embedded systems are required to perform more and faster on-board data processing. They are autonomous in the sense that they may operate independently and do not require for example external communications in order to function. They are typically "edge" devices. Sensors, embedded processors, and hardware in general have hugely evolved in the last decade, equipping embedded systems with large numbers of sensors that will produce data at rates that have not been seen before while simultaneously having computing power capable of large data processing. However, embedded software engineering has remained virtually unchanged for the last two decades, making the development of advanced applications extremely cumbersome, error-prone, suboptimal and usually delay incurring. In this disclosure, a novel approach to parallel data processing is presented that is based on state-of-the-art algorithmic trading software techniques, which is a field that underwent a similar challenge, although at a different scale, in the early 2000s. The approach presented here optimizes processing resources, simplifies development and makes applications much more reliable, therefore somewhat reshaping the paradigm of embedded software engineering. Benchmarks are presented for two rather different embedded application scenarios. One is for space on-board flight software in a limited computing capability platform, and the other one is for robotics on-board sensor fusion. In this disclosure, we show that the performance and determinism of the applications increase substantially with respect to traditional multi-thread approaches in both scenarios.

Examples of computing platforms in which embodiments of the invention may be implemented include the ODROID-XU4 and other similarly small computers such as the Other examples are Raspberry Pi4 and the Xilinx ZED-Board (used for testing described below with CAN). A common feature of embedded systems is that they are typically implemented in a single computer and thus it is to be assumed here that a "system" is implemented in a single computer unless otherwise stated.

The LMAX Disruptor is a high-performance concurrency framework based on CAS (Compare And Swap). It has drawn interest from industry due to its efficiency; the LMAX business software using it can, for instance, handle up to six million transactions per second. Further details of the LMAX disruptor can be found for example in Thompson, Martin; Farley, Dave; Barker, Michael; Gee, Patricia; Stewart, Andrew (2011) "Disruptor: High performance alternative to bounded queues for exchanging data between concurrent threads".

It is common ground that embedded systems have evolved hugely in the last decade. New generations of autonomous embedded systems are required to perform more and faster on-board data processing.

One of the most significant changes is the innovation and use of multicore processors. With a higher density of silicon, these systems offer increased performance per unit area, which is critical to meet the needs of modern avionics systems. Their use comes at a price, as unlike single core systems, they offer neither a deterministic environment nor predictable software execution times.

The slow progress of change in embedded software engineering is particularly relevant in the space sector, since currently available software solutions do not offer a sufficient degree of determinism for multi-core computer applications to meet the minimum requirements of this sector. A software solution providing reliable and efficient data processing to match the increasing sophistication and demands of advanced embedded applications, is therefore highly desirable.

Although embodiments of the present invention are generally applicable to all embedded systems, the specific fields where tests were performed are robotics and space. Hence, the specific discussion about the state of the art in both fields is included in this introduction.

An object of the invention is therefore the provision of parallel processing method that overcome the above limitations.

The embodiments described below are not limited to implementations which meet this object or solve any or all of the disadvantages of the known approaches described above, and some embodiments may meet other objects or solve other problems.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to determine the scope of the claimed subject matter; variants and alternative features which facilitate the working of the invention and/or serve to achieve a substantially similar technical effect should be considered as falling into the scope of the invention disclosed herein.

Some embodiments of the invention provide systems and methods for lock-free parallel data processing adapted for use with embedded systems employing a smart pointer-based data management and recycling system and circular batching queue.

In one aspect there is provided in the following a method of parallel data processing in an autonomous embedded system. The system may operate in the framework of an LMAX disruptor referred to further below. The method comprises: receiving a call to publish a data object, for example invoking the method "publish" for a data object. The data object is then cloned and placed it into a pre-allocated space in memory. The cloned data object or a pointer to the data object is placed into a batching queue. The cloned data object is delivered to one or more subscribers. The pre-allocated memory space may then be released.

As a result of the pre-allocation of memory space the normal memory management of LMAX is not required. In the original JAVA implementation of LMAX, Java memory management was relied on. Code had to be manually crafted to work with no memory allocations by the Java Virtual Machine (which eventually made use of the operating system allocations). In the case of C++ implementation, of LMAX according to embodiments of this invention, there is an implicit dependency in the operating system to perform memory allocations.

Embodiments of the invention may be realised using C++11 and later versions. Notably current implementations of LMAX do not clone data. Embodiments of the invention may enforce clones in order to ensure memory allocations from the operating system in any scenario. This is a compromise that has been shown to have advantages as the following explanation will show. In general the use of clones may be considered to reduce performance. Further, no memory allocations lead to a high level of safety and determinism for critical applications.

It will be appreciated that embodiments of the invention may be implemented in embedded systems where data is published to subscribers. The data object may comprise sensor data, event data, tasks, bindings, or any other data that may be subscribed to. Subscribers may be objects in the embedded system which may then process the data, for example for use in navigation in an autonomous vehicle, or export it, for example to be stored externally. Subscribers are also referred to here as "consumers". The publication may be from multiple producers to a single subscriber, i.e. parallel-in, or from one producer to multiple subscribers, i.e. parallel out.

Some embodiments of the invention can handle tasks via the eventloop, as described further here, which makes it not only a publish-subscriber mechanism, but a scheduling system as well.

Embodiments of the invention may also be used to publish bindings, being direct connections (or hooks) between a middleware, such as ROS or CAN and the eventloop. The novelty here is that these hooks may be running on their own thread each and are acting as producer to the eventloop.

The data may be published asynchronously. In other words the publishing of the data may be out of sync with the receipt of calls to publish the data.

There is also provided here a computing system comprising one or more processors and memory and being configured to implement any of the methods described here, to operate autonomously and to be embedded in an autonomous device such as but not limited to a robot or satellite.

Embodiments of the invention may be implemented in existing computers and therefore another aspect provides instructions for a computer, for example on a non-transitory or transitory computer readable medium, comprising instructions which when implemented in a computer cause the computer to operate any of the methods described here.

BRIEF DESCRIPTION OF THE DRAWINGS

The invention will be better understood with the aid of the description of embodiments given by way of example and illustrated by the figures, in which:

FIG. 10 is a schematic overview of parallel data processing solutions used in the multi thread approach and in a method according to some embodiments of the invention (labelled Klepsydra).

FIG. 11 is a graphic presentation comparing data processing rate throughput at 3000 Hz of multi-thread processing with a processing method in the space testbed according to some embodiments of the invention.

FIG. 12 is a graphic presentation comparing throughput by data rate of multi-thread processing with a processing method in the space testbed according to some embodiments of the invention.

FIG. 13 is a graphic presentation comparing standard deviations for processing times by data rate of multi-thread processing with a processing method in the space testbed according to some embodiments of the invention.

FIG. 14 is a graphic presentation comparing CPU usage by data rate of multi-thread processing with a processing method in the space testbed according to some embodiments of the invention.

FIG. 15 is a graphic presentation comparing RAM usage by data rate of multi-thread processing with a processing method in the space testbed according to some embodiments of the invention.

FIG. 17 is schematic diagram similar to FIG. 16 showing parallel data processing for a one producer/multiple subscriber embodiment.

FIG. 24 is a schematic diagram similar to FIG. 16 showing parallel data processing for a multiple producer/single subscriber embodiment.

DETAILED DESCRIPTION OF POSSIBLE EMBODIMENTS OF THE INVENTION

Figure 1:
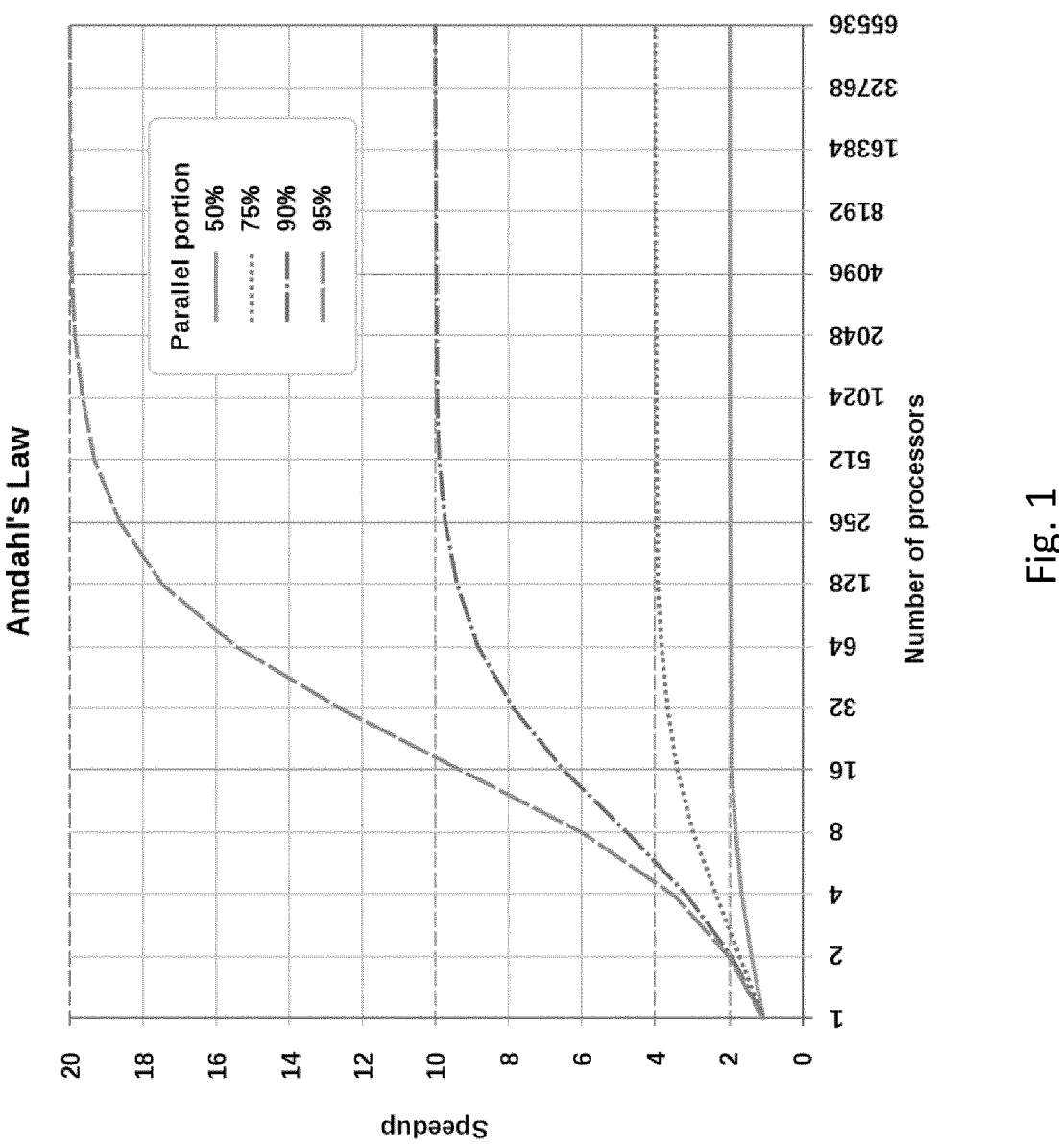
FIG. 1 is a graph depicting parallel processing limitations according to Andahl's Law.

Embodiments of the present invention are described below by way of example only. These examples represent the best mode of putting the invention into practice that are currently known to the Applicant although they are not the only ways in which this could be achieved. The description sets forth the functions of the example and the sequence of steps or operations for constructing and operating the example. However, the same or equivalent functions and sequences may be accomplished by different examples.

Nowadays, a robot might be processing data coming from dozens of sensors. Electronics manufacturers offer more and more variety of sensors: Optical sensors, Biosensors, Touch sensors, Image sensors, etc. At the same time, the quality of sensor devices improves too, giving more and better measurements. Furthermore, a robotic system must also process data coming from other sources including: commands, messages from other robots, cloud data processing, etc. In summary, a robotic system can nowadays easily produce thousands of data events per second and the software application will have to process them.

Space applications requiring on-board data processing at high rate is a growing field. On the one hand, constellations of satellites is a growing market. LeoSat, for example, are building their high-throughput satellites that will form a mesh network interconnected through laser links, creating an optical backbone in space which is about 1.5 times faster than terrestrial fiber backbones. OneWeb, will provide a global constellation of low Earth orbit satellites that will provide low latency, high-speed broadband to even the most remote locations on Earth. These both cases, although with different purpose, face similar requirements in terms of data processing: dispatching and processing thousands of Earth requests per second, intensive satellite to satellite communications (coordination, routing, positioning) and high throughput data link to Earth. All these demanding requirements mean development of high rate data processing applications.

In a different field, vision-based navigation, there is also a challenge of data processing combined with computationally heavy algorithms. One example is rendezvous with uncooperative objects in space, e.g., debris removal. Another example of this is autonomous pinpoint planetary landing, where the number of sensors and the complexity of the Guidance Navigation and Control (GNC) algorithms make this discipline still one of the biggest challenges in space. One common element to these two use cases, is a well-known fact in control engineering: for optimal control algorithms, the higher the rate of sensor data, the better is the performance of the algorithm.

In the previous two subsections, we showed that the amount of data going through an embedded system has increased substantially in the past few years. On the other hand, we have presented two very different use cases that show that this trend is common ground in embedded systems.

There is another important factor, which is the evolution of embedded computers. As the computational capabilities of embedded processor increase, and the data processing need grows, some parallel processing limitation might appear as the well-known Amdahl's Law. In computer architecture, Amdahl's law (or Amdahl's argument, FIG. 1) is a formula which gives the theoretical speedup in latency of the execution of a task at fixed workload that can be expected of a system whose resources are improved. If not addressed properly, this situation can become a bottleneck for future embedded applications.

This parallel data processing problem has been around a long time and has been successfully solved in other sectors like financial trading. In general, the use of lock-free programming techniques have largely improved performance and determinism in parallel data processing applications. In this disclosure, a novel solution is presented that accelerates parallel data processing applications by means of applying some of these lock-free programming techniques developed in the financial trading sector. The solution has application in space and robotics applications to produce data processing rates that are substantially faster than traditional parallel processing approaches, as well as other applications.

Based on this pattern and combining it with the new smart pointers in C++11 and wrapping it within a publisher subscriber pattern, an aspect of the present invention provides a simple API (application programming interface), miniaturization of the LMAX disruptor for embedded systems. The functionality of the disruptor pattern is described here in relation to two main approaches. The term "smart pointer" is used here to refer to a pointer used to make sure that an object is deleted if it is no longer used (referenced), as known for example in C++11.

Figure 2:
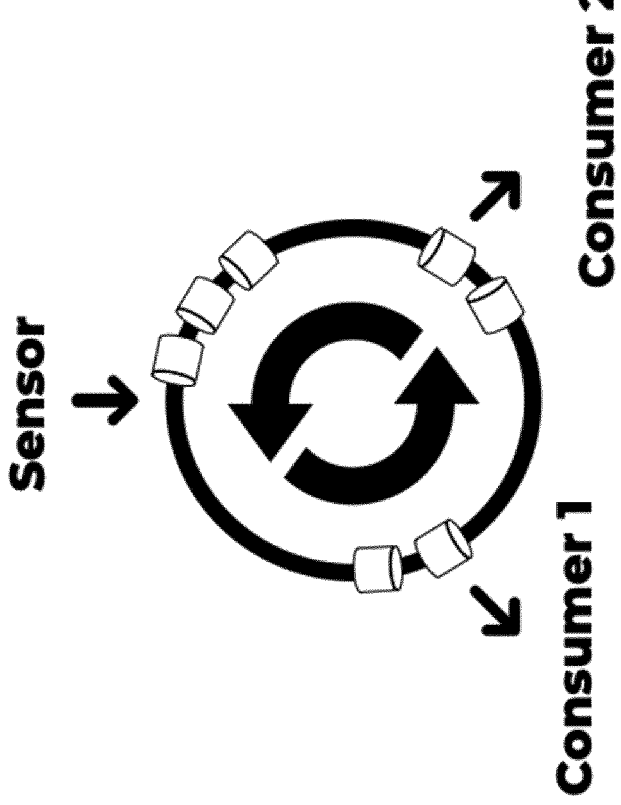
FIG. 2 is a schematic presentation of the lock-free sensor multiplexer configuration of a method, according to some embodiments of the invention.

The first approach is the sensor multiplexer as shown in FIG. 2, which is a single producer, multiple consumer solution. Consumers are also referred to here as "subscribers". The term "producer" is used here to refer to the source of the data which might be for example a sensor and is not necessarily part of a system according to embodiments of the invention. The data is published by a publisher and hence the publisher may receive a call to publish the data, typically in the form of a data object, from a producer. Alternatively a single producer/publisher object may be provided, in other words the publisher may be considered to be a producer.

Figure 3:
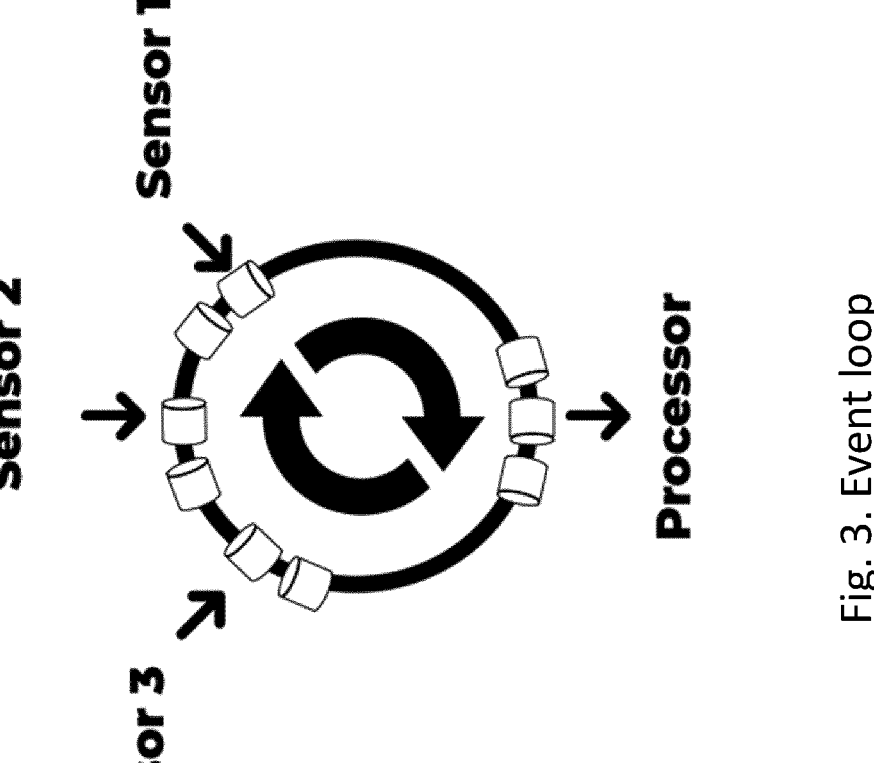
FIG. 3 is a schematic presentation of the lock-free event loop configuration of a method, according to some embodiments of the invention.
Figure 4:
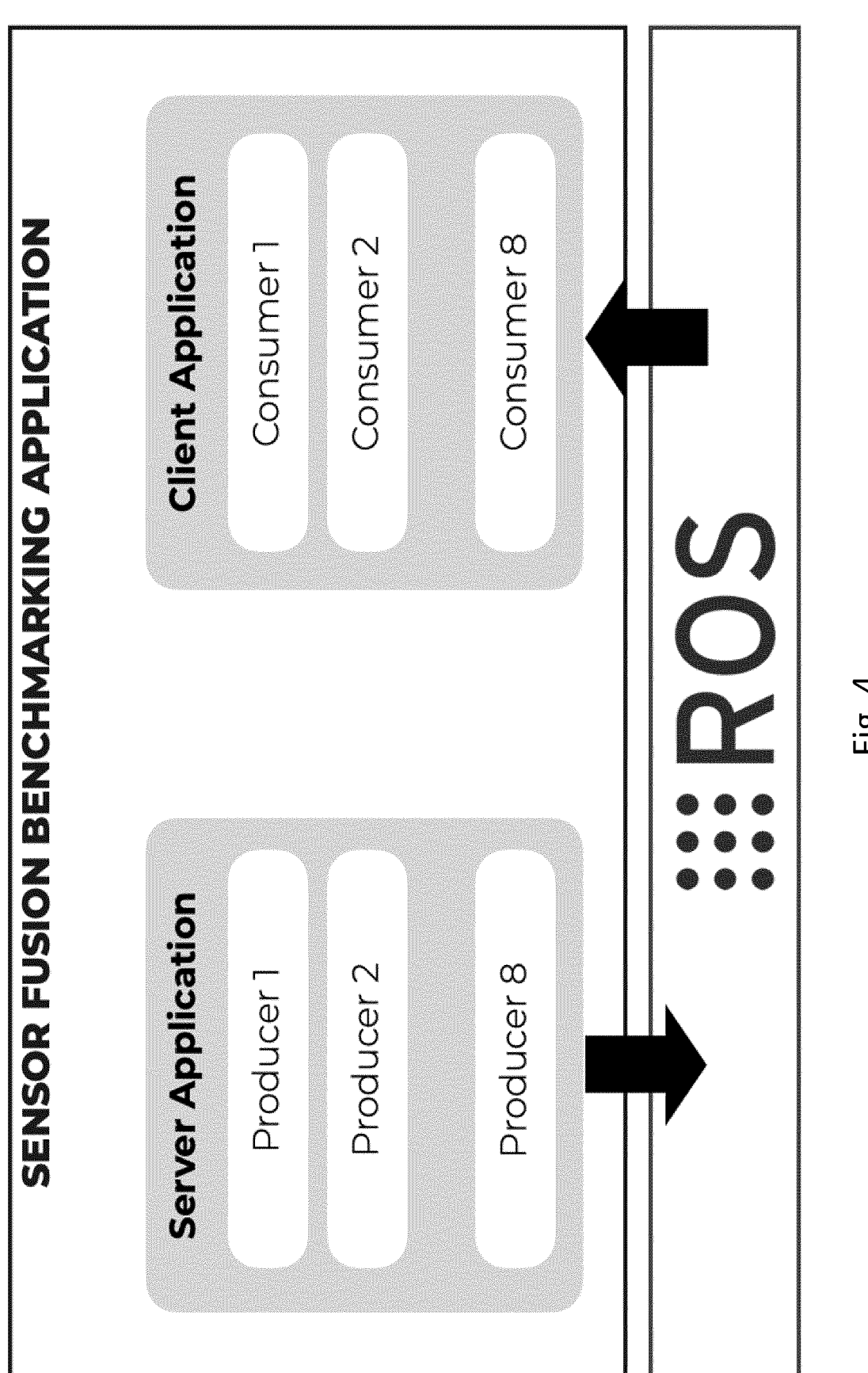
FIG. 4 is a schematic presentation of a sensor fusion setup for Robot Operating Systems, according to some embodiments of the invention.

The second approach is an event loop (FIG. 3) loosely based on this development for financial systems, the event loop presented here is lock-free, high performance and with a degree of determinism that has not been seen before in embedded systems. An event loop is a programming construct or design pattern well known to those in the art of computer science. In FIG. 3 it can be seen that there are multiple producers but possibly only one subscriber. The term "event loop" is used here according to the definition in NodeJS programming language, found for example at https://nodejs.dev/learn/the-nodejs-event-loop, which is the most common definition. It means that data arrives from multiple sources in parallel in a multi-threaded manner, but data is consumed in a single-threaded manner, without new consumer workers being created or spawned.

In both approaches data is processed in parallel, either incoming in parallel or outgoing in parallel.

Although there are two separate testing scenarios, they both share some common design, these are the specific features:

Multiple producers and single consumer or vice versa

Collection and aggregation of data to be stored in disk

Configurable producer rate and number of producers.

The following two subsections show the specific details for spacecraft and robotic system experiments.

Robotics Testbed

The robotic testbed was based in the Robot Operating System (ROS). The ROS is by far the most used software development framework for robotics applications. It is also clearly dominant in aerospace, and self-driving cars. ROS was originally built for academia and its purpose was to accelerate the development of prototypes for robotic research. However, requirements like performance and reliability were not taken into account when designing this framework, which is why ROS really struggles with fast data processing. ROS offers two ways of delivering messages or sensor data to the application:

The most common one is the single thread spinner. Here, ROS delivers the messages sequentially to the application. It is similar to a simple event loop.

The second way to do that is by using the async multi-thread spinner. In this case, there is no event loop and messages are delivered concurrently to the application.

Applications using this approach must have some thread contention code in order to function correctly.

In this disclosure we present a third alternative kind of parallel data processing. In this case we combine the multithread implementation of ROS with a lock-free event-loop as described in the previous section. This implementation is very well suited for situations like high frequency sensor fusion and it should enhance the performance of ROS substantially.

A simple benchmark test was developed. It consists of a set of eight sensor providers in the form of publishers. In the client side, we subscribe to these eight sources of data and do some simple data processing consisting of fusion of the data in a JSON object and save it to file.

The results show that by combining ROS with an event-loop as described further here, for example with reference to FIG. 16, robotic applications run faster and more stable than without our solution. Sensor fusion with ROS and our solution can be done with a degree of reliability and performance that otherwise has not been seen before with ROS.

Embodiments of the invention are not limited to the use of event loops and may also be used for data multiplexing as described further here.

The application for the single-threaded solution is represented in FIGS. 5-8.

Figure 5:
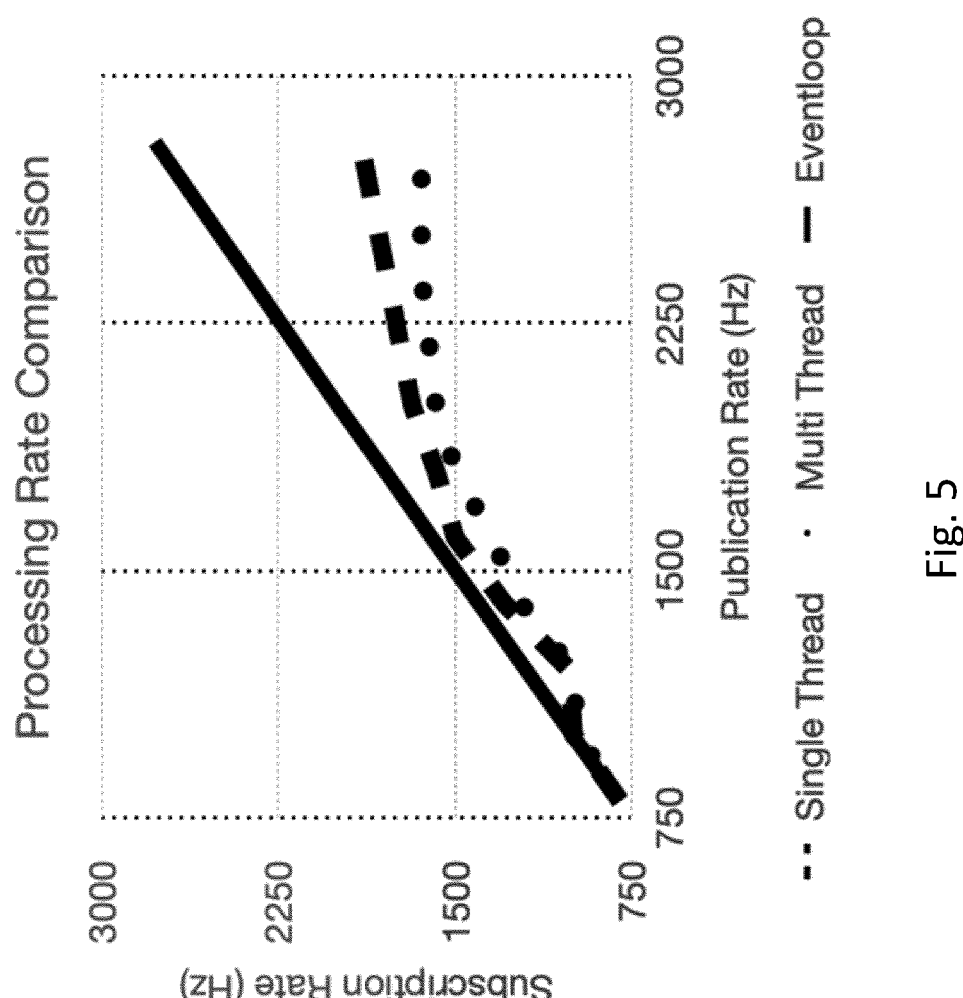
FIG. 5 is a graphic presentation comparing data processing rates of single thread processing, multi thread processing and a method of processing in the robotics testbed, according to some embodiments of the invention.
Figure 6:
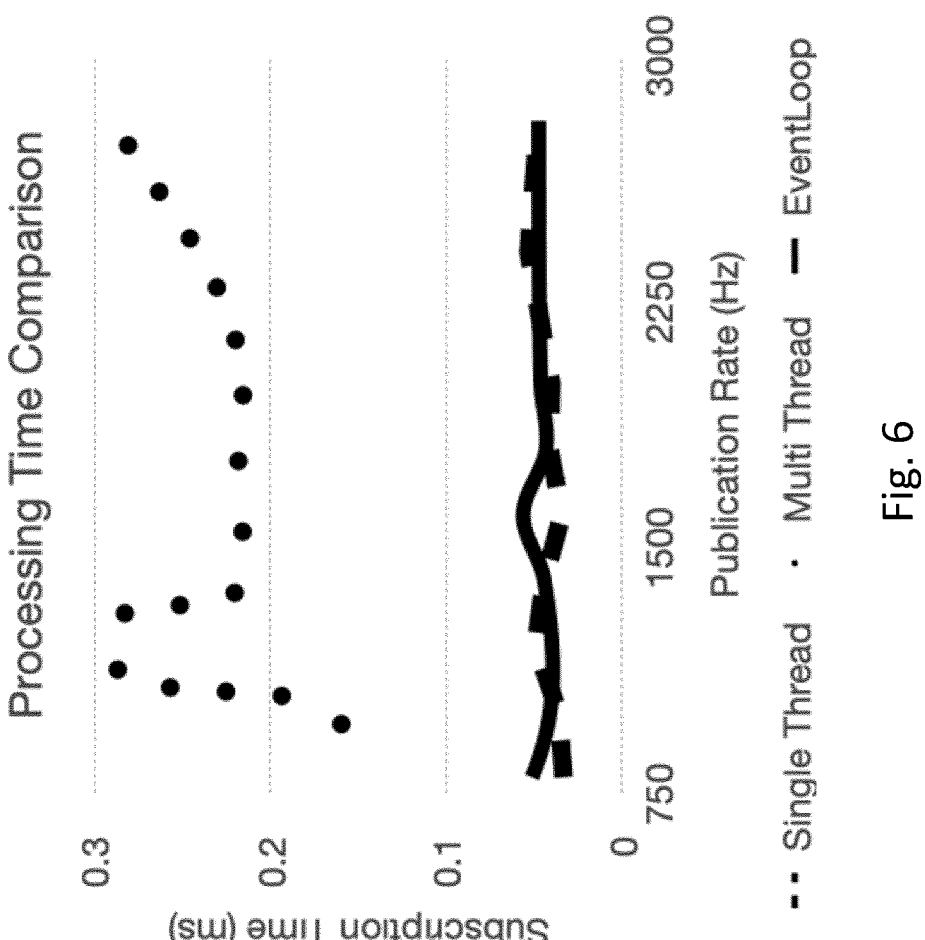
FIG. 6 is a graphic presentation comparing processing time of single thread processing, multi thread processing and a method of processing in the robotics testbed, according to some embodiments of the invention.
Figure 7:
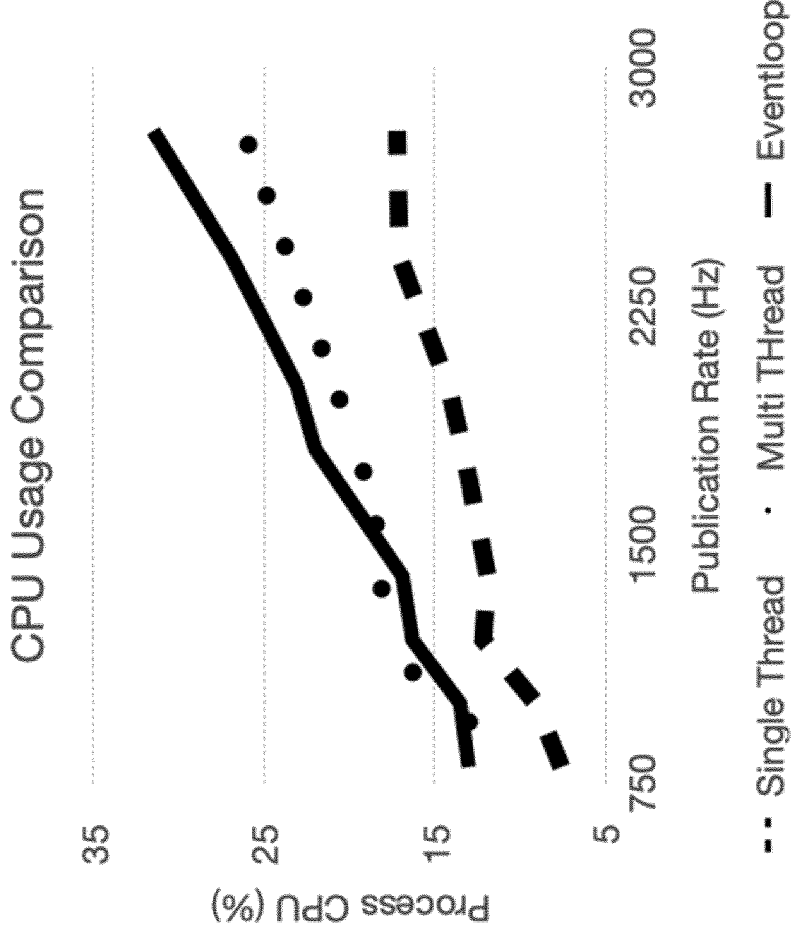
FIG. 7 is a graphic presentation comparing CPU usage by data rate of single thread processing, multi thread processing and a method of processing in the robotics testbed, according to some embodiments of the invention.
Figure 8:
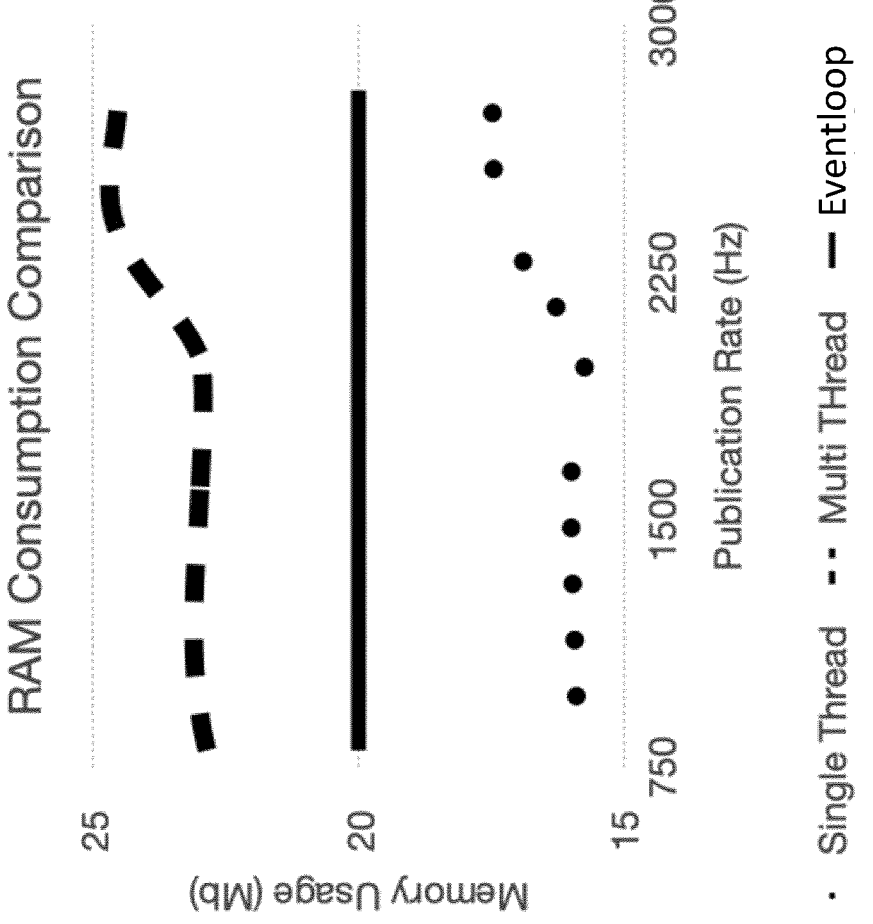
FIG. 8 is a graphic presentation comparing RAM usage by data rate of single thread processing, multi thread processing and a method of processing in the robotics testbed, according to some embodiments of the invention.
Figure 9:
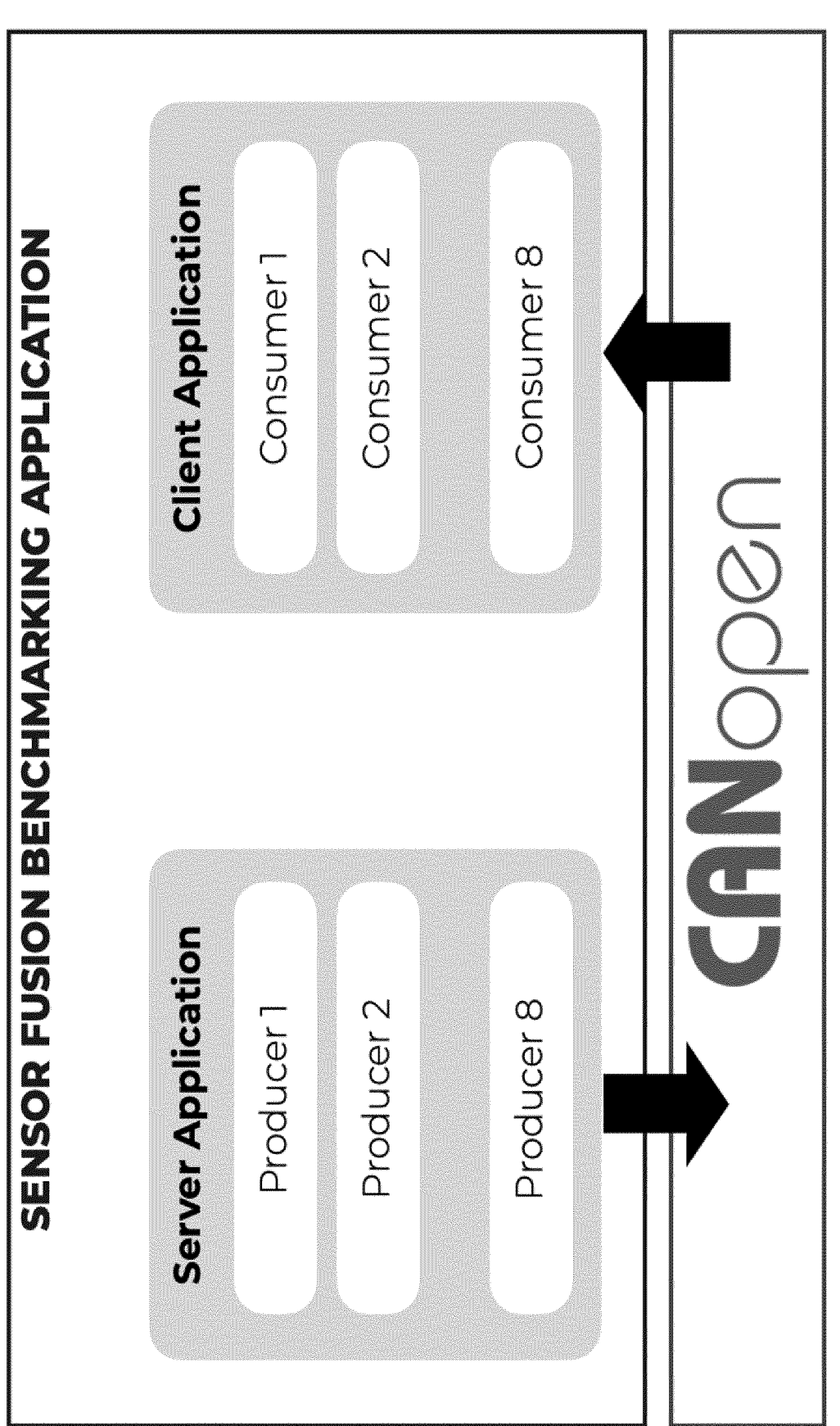
FIG. 9 is a schematic presentation of the sensor data processing setup as used in the CANopen benchmarking application, according to some embodiments of the invention.

In the subscription rate chart, as shown in FIG. 5, it can be seen that the single thread approach is unable to keep up with the required rate of data processing. This means that we are losing hundreds of precious sensor data events every second. In the subscription time chart, as shown in FIG. 6, it can be seen that each subscriber takes very little time to process the event. This is mainly because no concurrency contention code is needed with the single-thread approach. The CPU consumption, as shown in FIG. 7, is quite low and so is the memory usage, as shown in FIG. 8. This is a very well-known sub-optimal performance scenario: there is plenty of CPU to use, and yet the system is unable to cope with the load of data. In this case, the issue comes from ROS single thread spinning implementation, which is far from optimal.

Let us now continue with the traditional multi-thread scenario, also shown in FIGS. 5-8. In the subscription rate chart, shown in FIG. 5, we see that this solution is also unable to cope with the high frequency data publishing. Again, hundreds of events are lost every second without us knowing as this is kept internally to ROS. More importantly, in the subscription time, as shown in FIG. 6, the time taken is one order of magnitude bigger than the single thread approach and with a large standard deviation, which is a well-known issue in highly concurrent applications. CPU consumption, as shown in FIG. 7, is higher than the single thread approach, which is expected in a multi-thread scenario. Memory consumption, as shown in FIG. 8, is the highest of all approaches.

Finally, let us look at the results of the solution according to some embodiments of the present invention using an event loop, for example as shown in FIG. 16. We see that our fast performance event loop copes comfortably with the publishing data rate, as shown in FIG. 5, and therefore, no messages are lost in the application. In the subscription time FIG. 6 it can be seen that it is very similar to the one in the single thread. This is due to the fact that with this event loop applications do not need any thread contention code either. CPU consumption FIG. 7 is slightly higher than that of the multi-threaded approach. The reason for that is that our solution spends more time processing data than any other approach, while the multi-thread approach spends a big portion of the time doing context switches. RAM FIG. 8 is higher than the other solutions, but because we use a deterministic data allocation procedure, it remains constant throughout all different sensor data rates.

Space Testbed

The base application is quite like the one presented above for the robotics test bed. In this case, however, the data was received in a mix of SDO (Service Data Object), SDO blocks and PDO (Process Data Object) CAN (controller area network) open messages.

The testing of this solution was performed in two different environments. First in Zybo boards with Petalinux installed, and secondly in Zedboard with Xillinux installed.

The results presented here are for the Petalinux setup which performs substantially better than Xilinux. The reason behind is that Petalinux is optimised for Zynq boards, while Xilinux is more oriented to development and prototyping.

The sensor fusion benchmark test was performed with the parameters presented in table I below.

Throughput: The main performance criteria is the rate at which data is processed, or throughput. The traditional multithread and the event-loop approaches described here start to diverge when the total rate of all messages reaches 1500 Hz and when tested at a total of 3000 Hz, the difference between both approaches is substantial, around 15%, as shown in FIG. 11.

TABLE 1

| data processing test parameters | | |
|---|---|---|
| Parameter | Min | Max |
| Threads | 4 | 64 |
| SDO PDO Rate | 5 Hz | 100 Hz |
| SDO Block Rate | 2 Hz | 5 Hz |

One noticeable feature is the small variability over time of eventloop data processing in comparison with the traditional approach, where the application has a big variability.

FIG. 11 shows the overall performance results with respect to increasing data rate. Firstly, the throughput of the traditional multi-thread application starts to degrade at 1500 Hz and is really noticeable reaching 15% degradation when close to 2.8 KHz data date. The eventloop disclosed here has a throughput that matches the input data rate, i.e., it is the best possible scenario.

Secondly, the standard deviation of the execution time, shows that the eventloop disclosed here has negligible value, while for the multi-thread application, this value is quite large, making any application quite unpredictable.

Regarding resources utilization, the solution described here needs up to 10% less CPU for data processing. The reason is mainly the cost of context switching in traditional multi-thread applications. As for RAM usage, the solution described here needs more RAM than the alternative application, which is the only trade-off needed when using this software.

Comparison of Robotics and Space Results

In the ROS test, the eventloop described here outperformed ROS alone with an impressive 40% increase. However, here we have seen a 15% increase instead. The reason for this difference is twofold. First, CAN-open is quite a complex protocol with a big overhead of data, which makes it hard to scale given the amount of data exchanged back and forth. Second, this particular Linux distribution, is quite optimal in terms of performance. However, the solution described here achieves the same level of predictability and scalability found in the ROS test. The main difference in the space scenario, is that the solution described here can also reduce the CPU consumption. The reason for that comes from the cost of context switch in this setup limited in resources.

In most use cases, there is a combination of sensors producing data at high rates simultaneously with a slow and heavy data processing block. In a traditional operating system, this is solved by using different threads that deal with different parts of the application, e.g., one thread reads images from camera, another thread does the filtering/processing, etc.

In real-time operating systems, one would use the same sort of concepts: Threads for the various classes of activities and protected synchronization and inter-task communication. The scheduling methods are different though in order to prefer predictability in comparison to average case behaviour. Just a few examples of issues:

In case of multi-core, there is strong execution-time interference via shared resources like busses, caches and main memory. Therefore, predictability in these cases is reduced. In highly critical cases (like avionics), this is a major problem.

Scheduling threads in case of multi-core is more complex as one needs to schedule in time (when) and space (which core). Moving a thread (e.g., after waking up from blocking) from one core to another may have huge overhead in terms of context switch time as the local program and instruction caches need to be filled first.

The software application described here provides, in some embodiments, for lock-free parallel data processing in autonomous embedded systems, such as, by way of example, robotic embedded systems or space embedded systems. Other systems which may benefit from the advantages offered by this system, include autonomous drones, vision navigation systems, autonomous rovers, self-driving vehicles, and others.

Advantageously, the software application is not restricted to a particular platform but may be installed in most computers, Linux distributions and in a variety of microcontrollers and embedded systems.

In this application external data, such as, but not limited to, sensor data, are received by a producer and placed, for example by the publisher object, in pre-allocated object instances of a "Smart Object Pool" described further below, thus creating event objects for the received data. In other words, the "Smart Object Pool" comprises memory with pre-allocated spaces, also referred to here as "slots" into which data is placed, for example according to the type of data or to a subscriber. A plurality of data may be received concurrently or, optionally, sequentially in time. It is important that the allocation of the memory space does not change during the processes according to embodiments of the invention. The allocation of space, for example according to data type as described elsewhere here, does not change. Only the occupation of the space may change, for example by being replaced with more recent data, for example after previous data has been used as required.

The producer may be a sensor, but may be any other external provider of data, in particular numerical data.

The Smart Object Pool may be a lock-free memory management system employing smart pointers, but embodiments of the invention are not limited to this.

In some embodiments of the invention, event data are copied by the asynchronous publisher into event objects located in the Smart Object Pool and subsequently moved into a circular lock-free batching queue, for example a ring buffer. By default, a copy operation may be performed, that is the data is duplicated in the batching queue, but this behaviour can be modified in special variants of the invention. Some members of the event object may not be copied, or copied by reference only.

In some embodiments of the present invention, the batching queue could hold events of variable size up to a settable maximum, and the user may be given the flexibility to manage memory allocation.

Event objects may be subsequently transferred from the ring buffer to an asynchronous subscriber, for example by a handler object.

According to some embodiments of the present invention, the asynchronous subscriber or consumer may comprise a "container" or group of listeners and may pass a reference to the object contained in the ring buffer to each registered listener. Once the system has determined that no further transfer of the event data to consumers is required, the asynchronous subscriber may send an appropriate message to the object pool, which frees the event as available for reuse.

In some embodiments of the present invention, the overall functionality of the method can be configured in the following manner:

a. as a sensor multiplexer (FIG. 2), wherein data objects, for example event objects, are receivable from only one producer, such as a sensor, and wherein multiple consumers may receive the processed event objects. Each consumer may receive each individual processed event object no more than once.

b. As a lock-free event loop (FIG. 3), wherein data are receivable from a plurality of producers, such as sensors, and wherein each event object is only processed once and receivable by only one consumer.

In the first configuration, one producer/multiple subscribers, the memory may be pre-allocated to the producer.

In the second configuration, one subscriber/multiple producers, the memory may be allocated such that, for example, different kinds of data are allocated to different memory spaces, or "pools". The size of the pool may be allocated in various ways, for example according to the frequency at which the data is generated by the producer. The frequency may correspond to the frequency of requests to publish data objects. Examples of different kinds of data may include but are not limited to working state, temperature, battery status and others.

In both examples, one smart object pool is provided per producer.

However the memory is allocated, the allocation remains constant during the cycle of publishing data to one or more subscribers.

A system according to some embodiments of the invention may be configured as a sensor multiplexer, in which case a listening thread may be is created for each registered consumer linked to the publisher. The listening threads may pass the event data by reference to its corresponding consumer. Once all consumers have processed the event object, they may be returned to the Smart Object Pool.

A system according to some embodiments of the invention may be configured as a lock-free event loop, in which case the event object may be passed to an event emitter, which invokes the consumer. The event emitter may take the form of an LMAX disruptor configured to work as a multiple producer/single consumer setup. Once the consumer has processed an event object, this event object is returned to the Smart Object Pool.

According to some embodiments of the invention, placing copies as opposed to original event objects into the batching queue for processing and recycling processed event objects in the Smart Object Pool avoids the need to periodically and actively free up memory at high cost to CPU, and prevents memory space from being cluttered with event data, which have been processed and are no longer required, thus rendering the overall system more deterministic.

Employing the Smart Object Pool to for data management has several advantages:

Firstly, any incoming data has only to be copied once during the entire processing system.

No memory allocations are required in this processing system.

Waiting periods for allocation of free memory are avoided, as is the added cost on CPU of a garbage collector feature, resulting in an improved deterministic behaviour of the processing system, in accordance with some embodiments of the present invention.

The Smart Memory Pool is lock-free and therefore further reduces the CPU consumption of the claimed processing system when compared to conventional multi thread or single thread processing systems.

This efficiency is demonstrated in the increased data processing rate when compared to conventional multi thread or single thread processing systems (FIG. 5).

As a further advantage over conventional multi-thread processing methods, some embodiments of the present invention may significantly decrease standard deviation for processing time, for example at least 9-fold or better, as evidenced in the CANopen system for CubeSat (FIG. 12 and FIG. 13).

The improved standard deviation of this method renders it particularly suitable for embedded system with a need for a high degree of reliability, reproducibility and determinism.

A system according to some embodiments of the invention is illustrated in FIG. 16. The system comprises an asynchronous publisher 10, a memory pool 12, a ring buffer 14 and an asynchronous subscriber 16. The memory pool 12 may contain a number of pre-allocated object instances (not shown in FIG. 16).

A method according to some embodiments of the invention will now be described with reference to FIG. 16b. The method may comprise receiving a call at operation 1601 to publish a data object, such as an event, for example at the asynchronous publisher 10. The call might come from a producer such as a sensor or other device external to the computer implementing the method. The call may identify a memory space that has been pre-allocated to the sensor or a group of sensors producing similar data. The allocation of memory space may be transparent to the producer.

The publisher 10 may initiate the copying, or cloning, of the data object and placing it into the pre-allocated space in the memory at operation 1903. The data object or, optionally, a pointer to the object, may then be placed into a batching queue, for example the ring buffer 14, at operation 1905.

The ring buffer, or ring buffers consumer sequence, may publish the cloned data object, in other words notify subscribers of newly available cloned data. This may take place by delivering the cloned event to one or more subscribers, for example the asynchronous subscriber 16, at operation 1607. The subscriber 16 may comprise one or more listeners as mentioned above, in which case the subscriber may then invoke all listeners associated to the publisher 10. A decision is made at operation 1609 whether all listeners have finished processing the data. In the affirmative, i.e. after the subscriber, or all listeners comprised in the subscriber, have finished processing the data as indicated at operation 1609, the cloned data object is recycled back to the pool 12 at operation 1611. In other words part of the memory space previously occupied by the cloned data object is released for the publication of a new data object. However, if the subscriber, or all the listeners comprised in the subscribers, have not finished processing data, as indicated by decision 1609, the system waits for all the subscriber, or all the listeners 19a-b comprised in the subscribers to finished processing data, at operation 1613 before the decision operation 1609 is repeated.

It is known in the art how to check whether subscribers no longer require a data object. For example, references in code to a pointer to a data object, such as may be generated by subscribers, may be monitored. When no more such references are detected, it may be assumed that the data object is no longer required. This may be achieved using smart pointers as known in C++11 onwards. An important aspect of embodiments of the invention is that when new data is to be published it is not necessary to request a memory space from the operating system, as would normally be required. Because the memory is pre-allocated and the allocation does not change, the memory space is always available for the data. This contributes to the speed of operation of methods according to embodiments of the invention. Asking the operating system for memory is costly in terms of processing power and time, and more importantly it is not a predictable operation and takes an undetermined amount of time.

Figure 19:
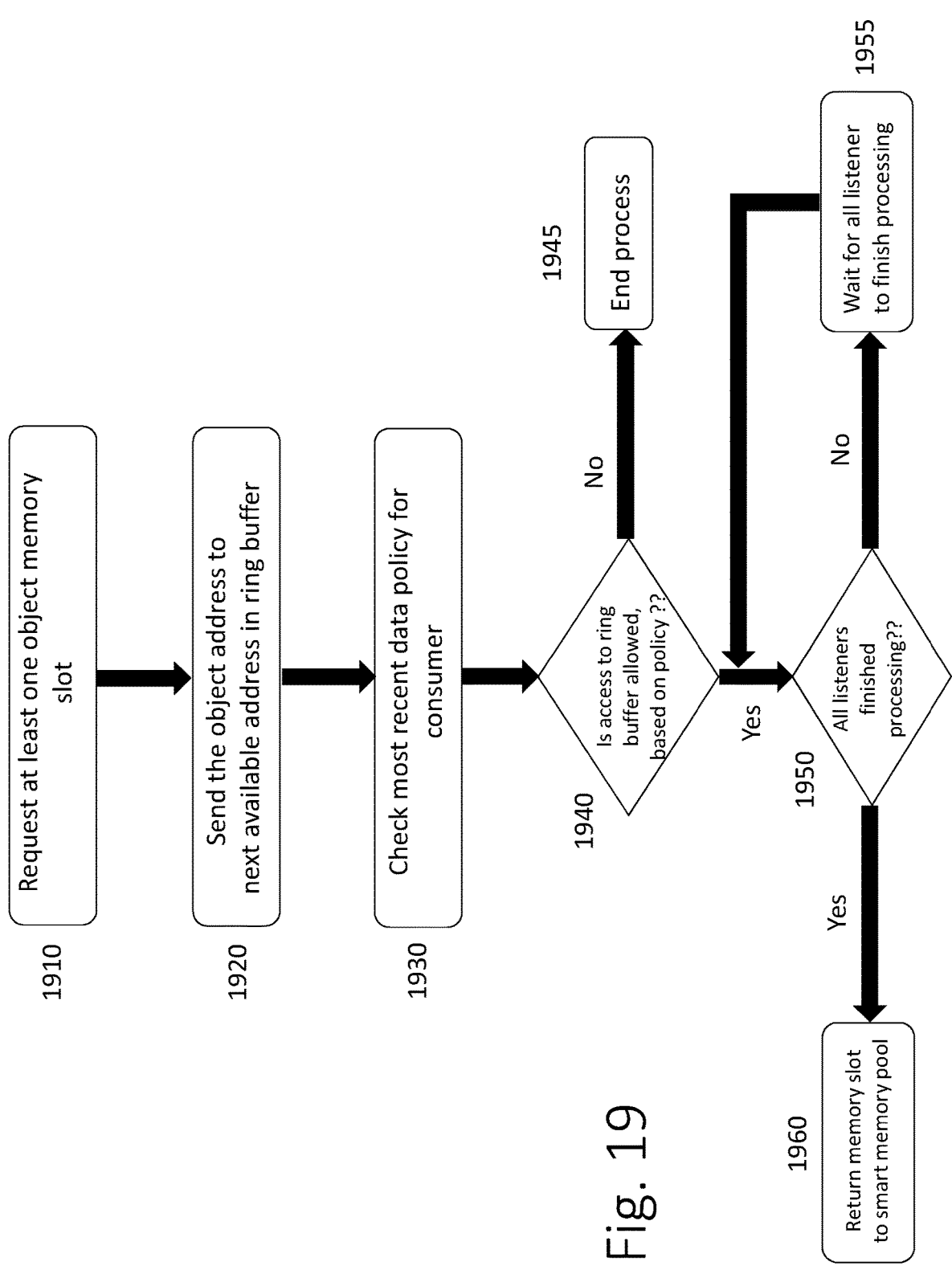
FIG. 19 is a flow chart showing a method which may be implemented in the system of FIG. 17 or 18 according to some embodiments of the invention.
Figure 20:
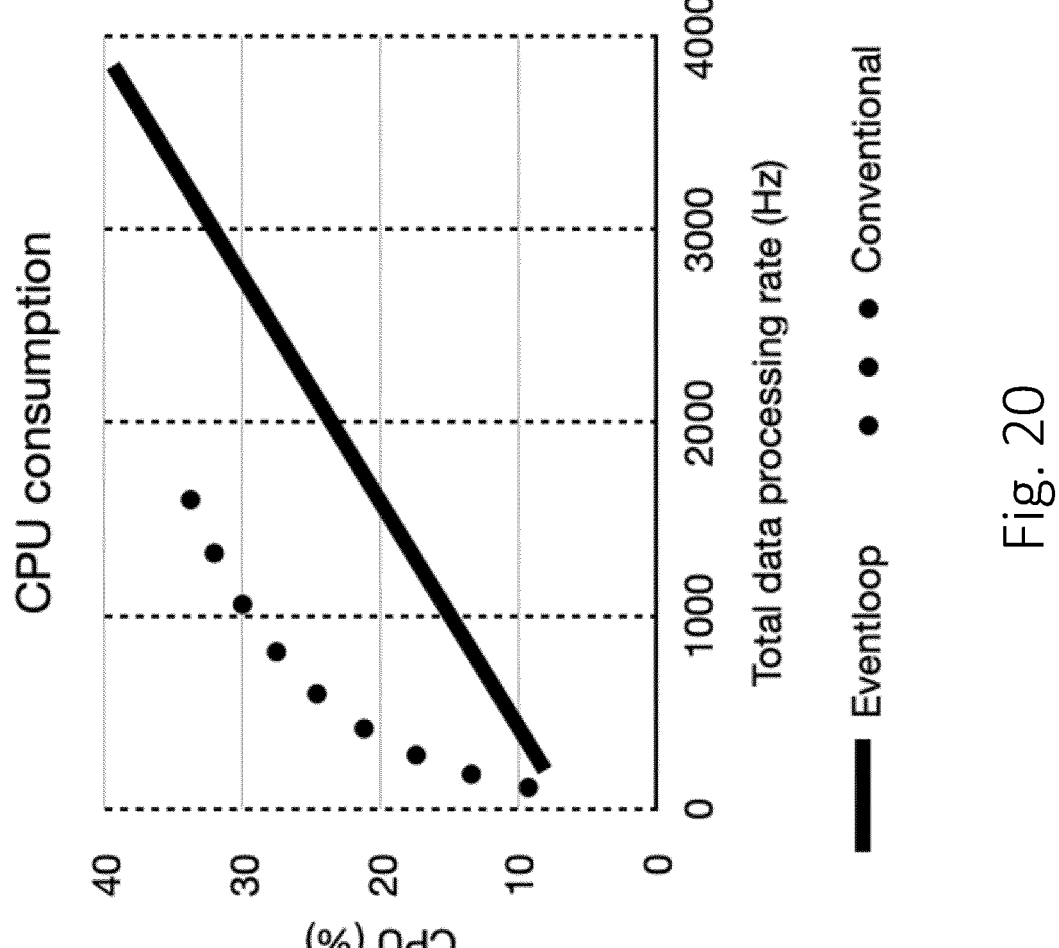
FIGS. 20 to 23 are graphs comparing one thread-safe queues and multiple thread-safe queues with methods according to some embodiments of the invention.
Figure 21:
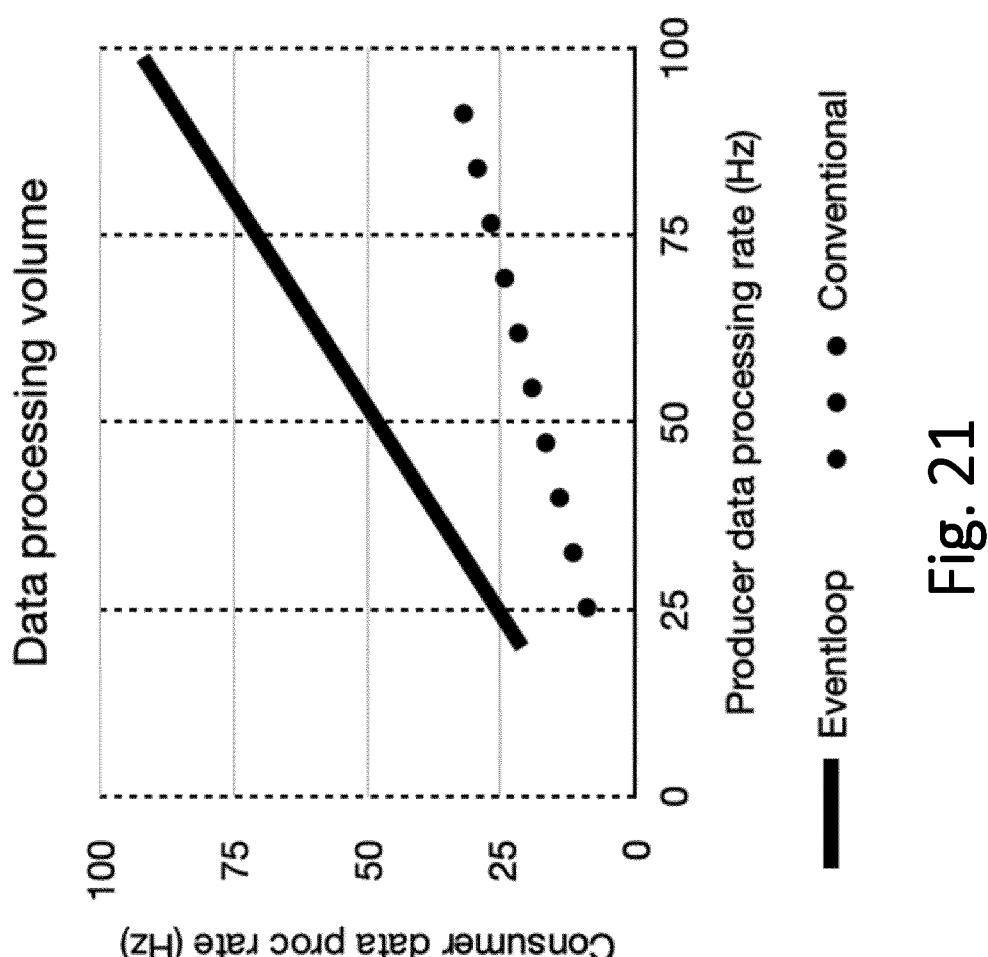
Figure 22:
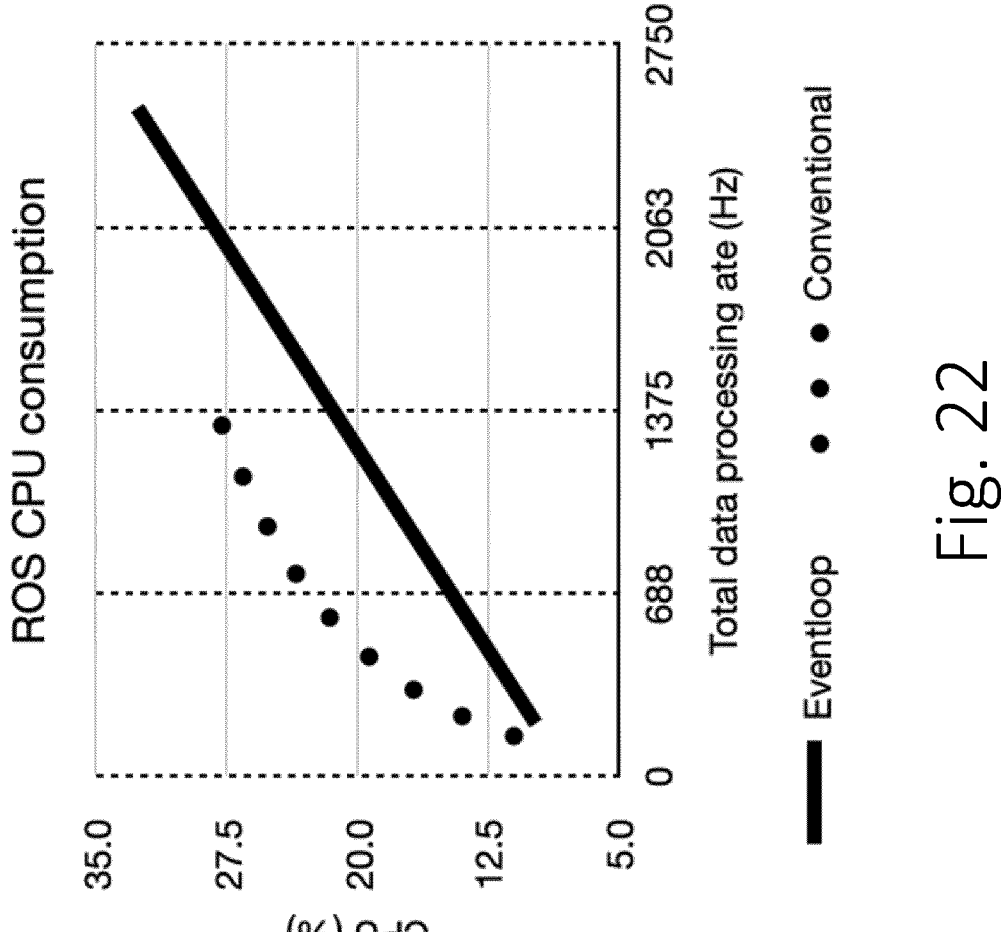
Figure 23:
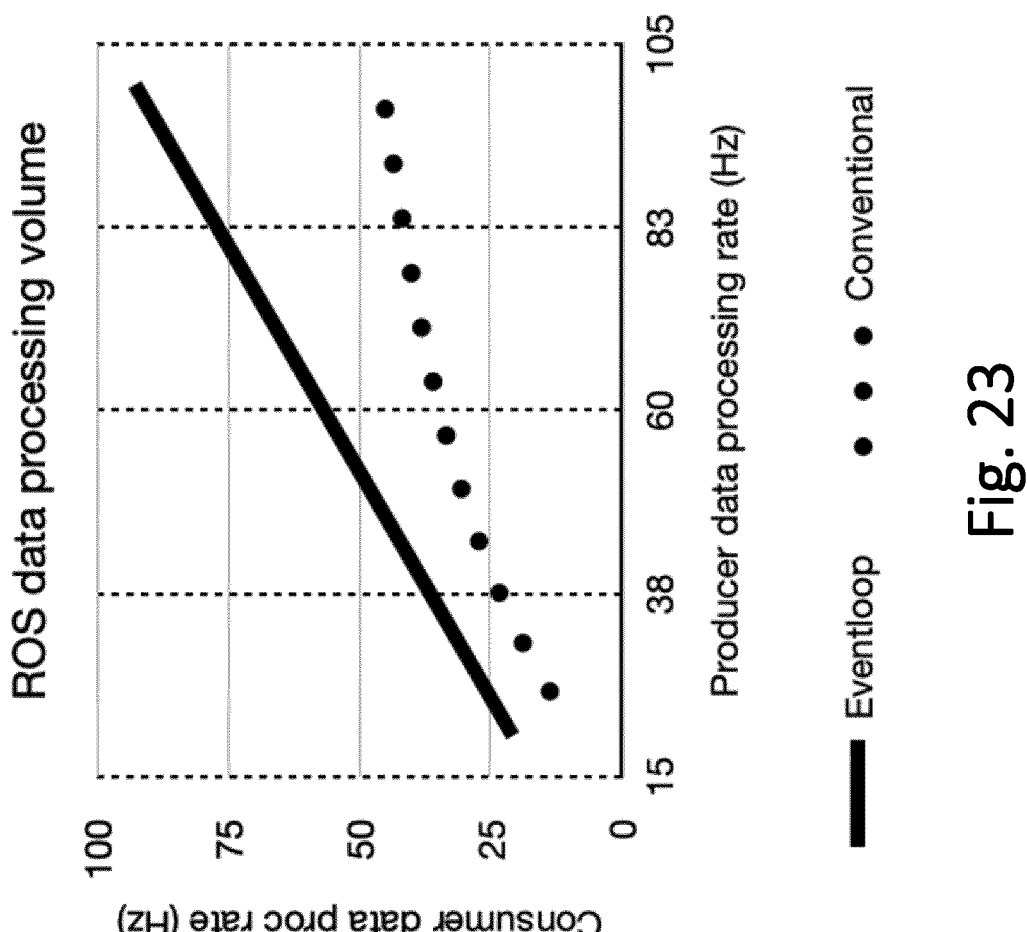

An example of a container of listeners is two or more listeners that are interested in different parts of a data object. FIG. 19 shows an example of a single consumer 19 in the form of a container comprising two listeners A and B, 19a and 19b. For example, one listener 19a may require only a part of the data comprised in the data object. To take the example of camera image data, one listener 19a may require only intensity, e.g. black and white, data while another 19b may additionally require colour data.

Figure 18:
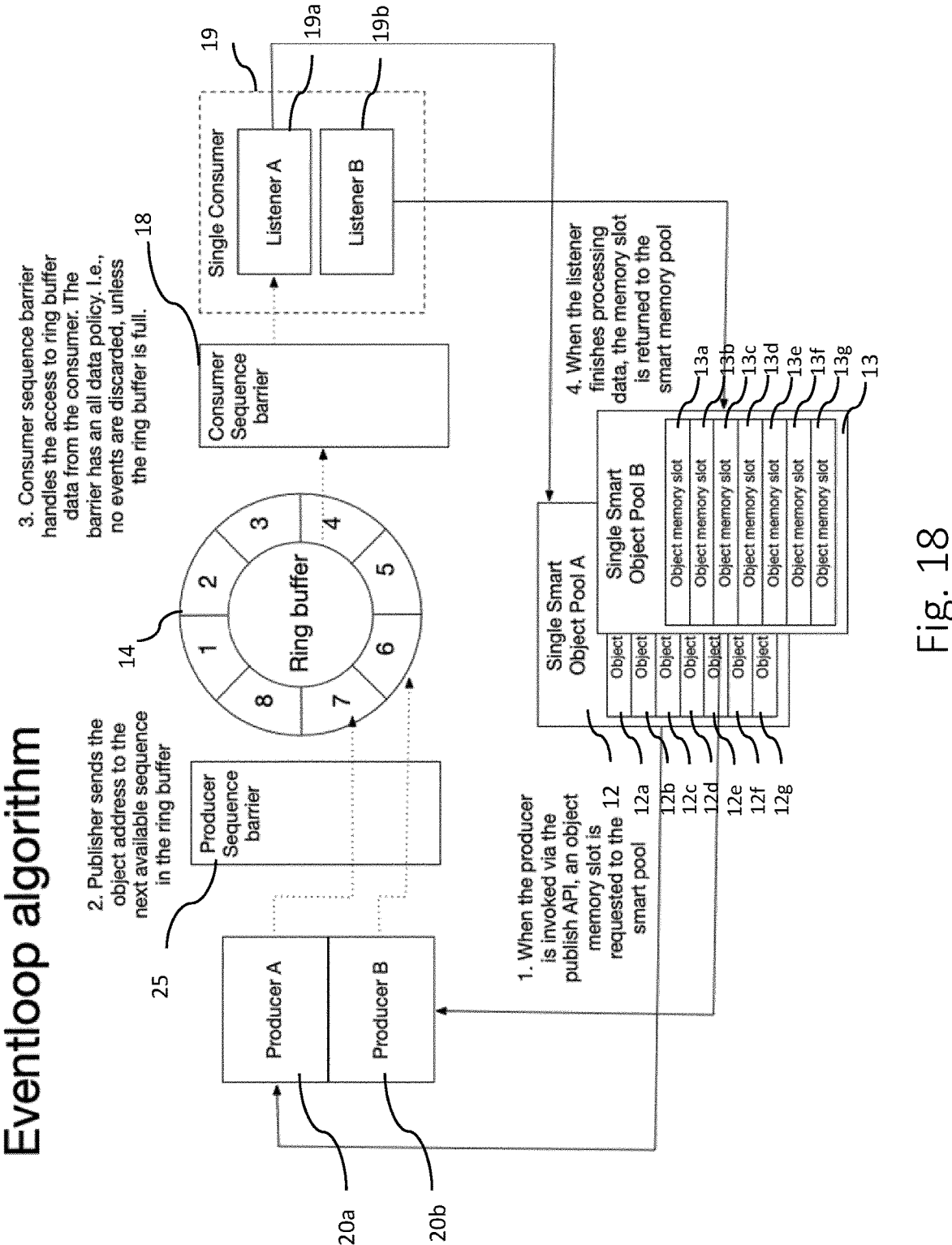
FIG. 18 is a schematic diagram similar to FIG. 16 showing parallel data processing for a multiple producer/single subscriber embodiment.

Two embodiments of the system shown in FIG. 16 are shown in more detail in FIGS. 17 and 18. In these figures like items are indicated with like reference numerals. FIG. 17 shows a one producer/multiple subscriber 20 embodiment, i.e. a multiplexer embodiment, and FIG. 18 shows a multiple producer/single subscriber 20a, 20b, embodiment, i.e., an event loop embodiment. In each case the data delivery mechanism is shown in more detail.

FIG. 17 shows, in addition to the features of FIG. 16, a consumer sequence barrier 18 between the ring buffer 14 and multiple consumers 19.

Sequence barriers are part of the LMAX original disruptor pattern. They keep pointers to the next element in the ring buffer: in the case of consumer barrier, it is the pointer to the next data to be processed, in the case of producer barrier (see FIG. 18), is the pointer to the next free slot in the buffer.

The smart object pool 12 is shown to be divided into separate slots 12a-12g. Notably also in FIG. 17 the asynchronous publisher 10 as shown in FIG. 16 is replaced by a producer 20. As noted previously the producer and publisher are interchangeable.

In the case of the data multiplexer, one instance of the data multiplexer may be provided for each of different types of data. One data multiplexer may be able to handle one type of data only, hence, only one smart object pool is needed. Smart object pools may also be data type dependent.

The embodiment of FIG. 17 operates in a similar way to the embodiment of FIG. 16. In addition the following operations may take place:

When the producer 20 is invoked, for example via a publish API, to publish certain data, an object memory slot corresponding to the data is requested from the smart object pool 12 and a pointer or other identifier of the slot containing the data to be published is returned to the producer 20. The producer 20 sends the object address/pointer to the next available sequence in the ring buffer 14. The data itself can then be accessed via the ring buffer 14 using the address/pointer.

In this embodiment, the ring buffer 14 is connected to a consumer sequence barrier 18. The consumer sequence barrier 18 is connected to the consumers 19 and the single smart object pool 12. The consumer sequence barrier 18 handles/regulates access to the data in the ring buffer 14, for the consumers 19, for example based on policy data associated with specific consumers 19. For example, a consumer A may only access data from slot 3 of the ring buffer 14, if a certain policy is satisfied. The barrier 18 may have a most recent data policy for the consumers 17 so that old events are discarded.

According to some embodiments of the invention, a policy may be that of independent consumer (subscriber) rates. In other words, different consumers may consume data at different rates. Embodiments of the invention may be used to ensure access to the most recent data and that data will be kept in the batching queue until processing by the subscribers is finished.

Supposing that the consumed data was provided from memory slot 12a, when the last consumer has finished processing the data, the memory slot 12a is returned to the smart memory pool, or released to be available for new data. This may be for example by the customers 19 notifying the consumer sequence barrier 18 and the consumer sequence barrier 18 notifying the smart object pool, as indicated in FIG. 17.

In the multiple producer 20a, 20b/single customer 19 embodiment shown in FIG. 18, a producer sequence barrier 25 is positioned between the producers 20a, 20b and the ring buffer 14 in addition to a consumer sequence barrier 18 as shown in FIG. 17. Notably also there are multiple smart memory pools 12, 13, one for each producer 20a, 20b, each having pre-allocated slots 12a-g, 13a-g. As shown in FIG. 18, the single consumer 23 comprises multiple listeners 24, 25. In this embodiment, the subscriber communicates directly with the smart object pools 12, 13, rather than via the consumer sequence barrier 18. Each smart object pool comprises a plurality of object memory slots 12a-g, 13a-g, wherein at least memory slot 12a of the plurality of memory slots 12a-g, 13a-g may comprise a number of pre-allocated object instances. The single consumer is served by a single thread which is constantly running waiting for data to come from the ring buffer.

The operations performed in the system of FIG. 18 are similar to those performed in the system of FIG. 17 and are explained in more detail in the flowchart of FIG. 19.

FIG. 19 is a flow diagram illustrating an example data publishing process, according to some embodiments of the present invention, that may be implemented in either of the systems shown in FIGS. 17 and 18.

Referring to FIG. 19, in operation 1910 when a producer 20, 20a, 20b, is invoked (for example, via a publish API), to publish data, a request (s) for a memory slot, e.g. 12a, for the data is sent to a smart access pool, e.g. pool 12, or in the case of multiple producers to the pool for that producer. Based on the received request, the smart access pool 12 sends the address or a pointer to the appropriate memory slot to the producer.

In operation 1920, upon receiving the address/pointer for the memory slot e.g. 12a, from the smart object pool 12, the producer sends the object address to the next available address in the ring buffer as shown in FIG. 18. In an alternate embodiment, multiple producers may send the object address to the next available address in the ring buffer via the producer sequence barrier 25 as shown in FIG. 19.

In operation 1930, the consumer sequence barrier 18 receives a request from a consumer or multiple consumers to access data in the ring buffer 14. The consumer sequence barrier 18 checks the received request (s), against at least one policy associated with the consumer (s) making the request (s). Based the result of the check(s) (operation 1940), the consumer sequence barrier 18 either allows the consumer (s) to access the one data in the ring buffer 14 at operation 1950 or ends the process by returning a null at operation 1945.

In operation 1950, the consumer sequence barrier determines if the consumer (s) have processed/accessed all required data from the ring buffer. The determination could be made based on at least one policy associated with the consumer(s). Based on the determination, the consumer sequence barrier 18 returns the object memory slot to the one smart object pool at operation 1960 as shown in FIG. 18, or waits for all of the consumer(s) to process/access all the data from the ring buffer (at operation 1955. In an alternate embodiment, the consumer sequence barrier may direct the consumer(s), or listeners associated with a consumer to return the object memory slot to the smart object pool (operation 1960) (as shown in FIG. 19). In the foregoing one memory slot is discussed but it will be appreciated that the same process may be implemented for multiple memory slots. Once the listeners of the consumer are done processing the data, and all consumers are past that point in the ring-buffer, the data memory slot can be released back to the smart object pool.

FIGS. 20 to 23 are graphs comparing one thread-safe queues and multiple thread-safe queues with methods according to some embodiments of the invention using an event loop, performed using an Odroid-XU4. The graphs show Odroid memory only CPU usage in FIG. 20, Odroid memory only data throughput in FIG. 21, Odroid ROS CPU usage in FIG. 22 and Odroid ROS data throughput in FIG. 23. Similar improvements would be expected for multiplexer embodiments of the invention.

Figure 16A:
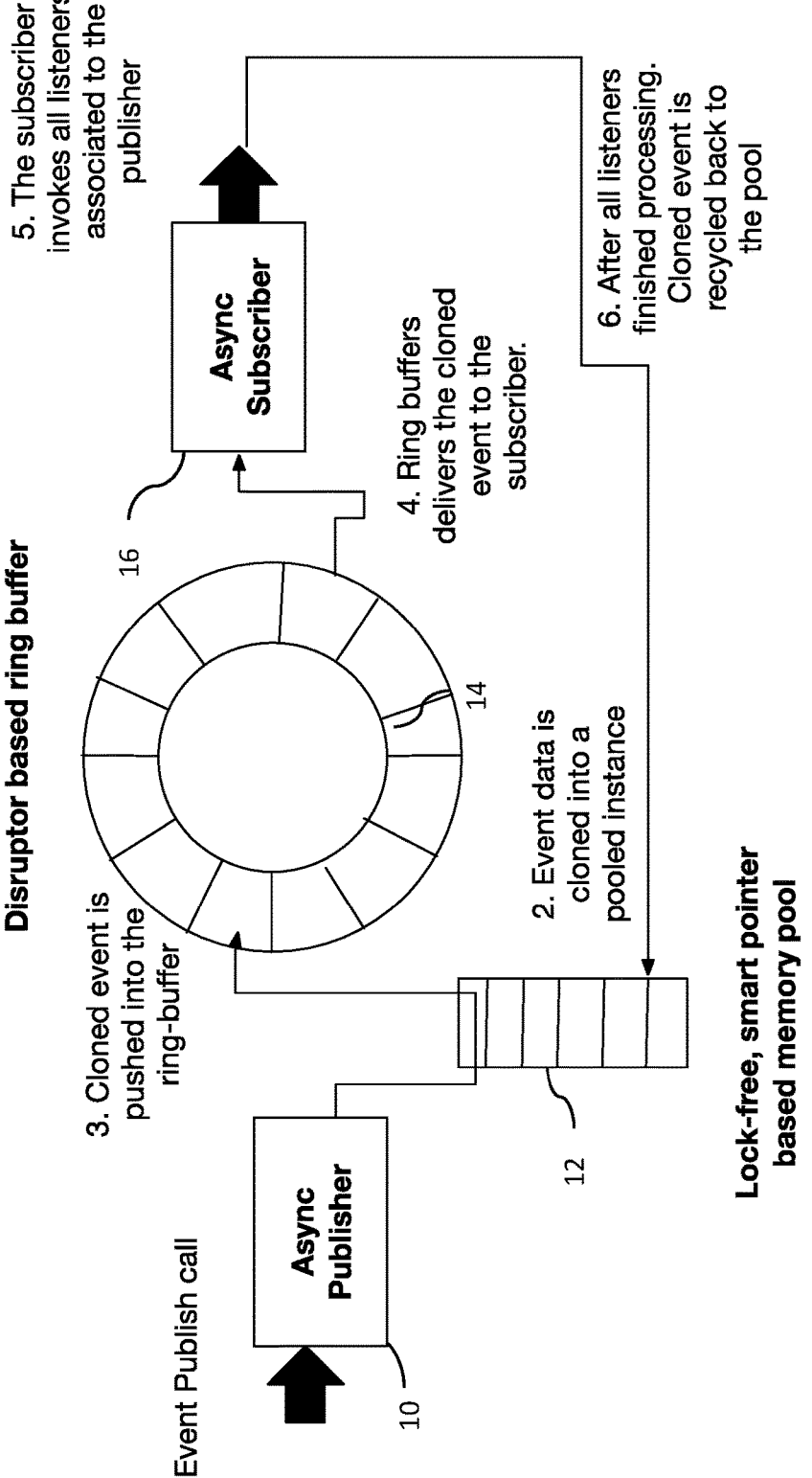
FIG. 16a is a schematic diagram of a parallel data processing system according to some embodiments of the invention.
Figure 16B:
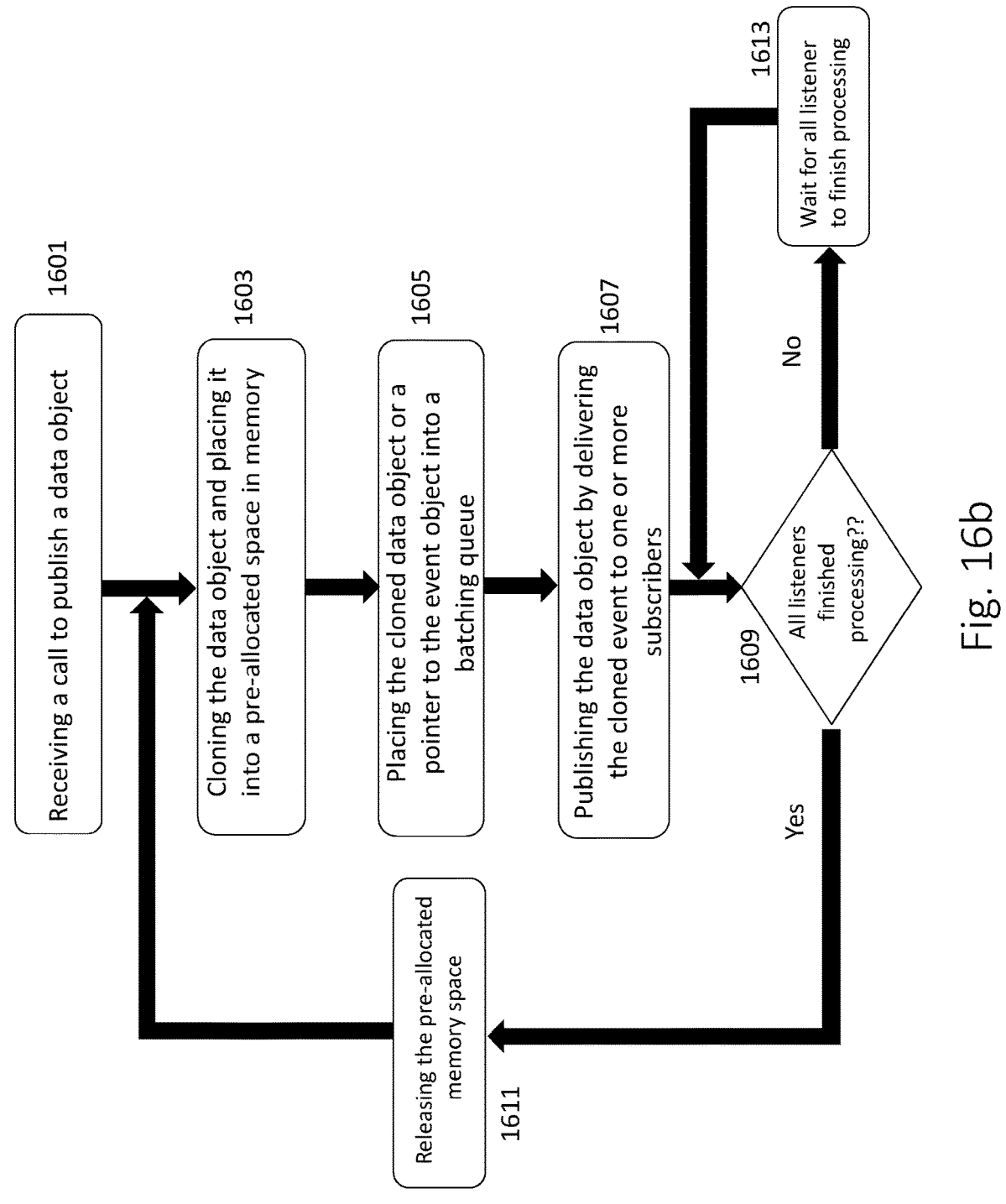
FIG. 16b is a flow chart showing a method which may be implemented in the system of FIG. 16a according to some embodiments of the invention.

FIG. 24 shows, in addition to the features of FIGS. 16a and 17, a middleware 30 (such as ROA and CAN) which connects to the eventloop 14 via multiple threads (such as thread 1, thread 2, and thread 3). Each thread comprises a middleware listener and a producer. In an example, thread 1 comprises a middleware listener A 11a coupled to producer 20a. The middleware listener 11a publishes the data to the event loop 14 using a publish call via the producer A and/or publisher (as illustrated in FIG. 18).

The claimed method may be carried out on a physical entity, whereby producers and consumers are independent software entities, which may either be part of the same physical entity or run independently from said entity.

As noted previously, in the described embodiments of the invention the system may be implemented as a single computing device. Such a device may comprise one or more processors which may be microprocessors, controllers or any other suitable type of processors for processing computer executable instructions to control the operation of the device. The device may also comprise memory, e.g. random access memory, as well as storage optionally in the form of flash memory. Depending on the system requirements, additional capabilities may be provided as is well known in the art such as external inputs and outputs, wireless connectivity and others.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

The figures illustrate exemplary methods. While the methods are shown and described as being a series of acts or operations that are performed in a particular sequence, it is to be understood and appreciated that the methods are not limited by the order of the sequence. For example, some acts or operations can occur in a different order than what is described herein. In addition, an act can occur concurrently with another act. Further, in some instances, not all acts may be required to implement a method described herein.

Moreover, the acts or operations described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

There is disclosed here a computer implemented method as described in the following clauses:

Clause 1. A computer-implemented method of lock-free parallel data processing in an autonomous embedded system comprising:

One or more producer object reading a plurality of sensors providing data of at least one external source, a Smart Object Pool, containing pre-allocated object instances, one asynchronous publisher object arranged to acquire an event object from the pre-allocated objects in the Smart Object Pool, copy the single instance of data published by the producer into the acquired event object, place the event object or, optionally, a pointer to the event object into a batching queue, a handler arranged for asynchronously delivering the events objects in the batching queue to one or more subscriber objects said one or more subscriber being arranged for sending the event objects to one or more consumer and for returning the event object to the smart object pool once it determines that no more consumer needs the event.

Clause 2. The computer-implemented method of the preceding clause, said batching queue consisting of a ring buffer Clause 3. The computer-implemented method of any one of the preceding clause consisting in either:

an Event Loop system wherein event objects are received from one or a plurality of producer, and wherein each event object is transmitted to one event loop consumer, or a Sensor Multiplexer system, wherein event objects are received from a single producer thread, and wherein each event object is multiplexed to one or to a subset of a plurality of consumers.

Clause 4. The computer-implemented method of any one of the preceding clauses wherein the producers and/or the consumers are software entities running in independent threads in a single processes.

The invention claimed is:

1. A method of parallel data processing in an autonomous embedded system operating in the framework of an LMAX disruptor, comprising:

receiving a call to publish a data object;

acquiring an object memory slot from a smart object memory pool, wherein:

the smart object memory pool is a lock-free memory management system employing smart pointers; and a separate smart object memory pool is provided for each of multiple producers, and each smart object memory pool comprises a plurality of object memory slots;

cloning the data object and placing it into the acquired object memory slot;

placing a smart pointer to the cloned data object or a smart pointer to the original data object into a batching queue, wherein:

the batching queue comprises a ring buffer; and a producer sequence barrier is implemented between the multiple producers and the batching queue;

publishing the cloned data object by the batching queue by delivering or notifying the cloned data object to one or more subscribers; and releasing the acquired object memory slot back to the smart object memory pool after the one or more subscribers have finished processing the data object;

wherein each step is caused by executing instructions based on C++ version 11 onwards.

2. The method of claim 1 in which the data object is published to multiple subscribers.

3. The method of claim 2 in which each subscriber may receive each data object no more than once.

4. The method of claim 1 comprising implementing a subscriber sequence barrier between the batching queue and the one or more subscribers.

5. The method of claim 1 in which data objects from multiple producers are published to a single subscriber.

6. The method of claim 5 in which the data object comprises a binding being a direct connection to middleware.

7. The method of claim 1 in which the memory is allocated such that different kinds of data are allocated to different memory spaces.

8. The method of claim 7 in which the size of the memory space allocated to a kind of data depends on the frequency at which the data is generated.

9. The method of claim 1 in which the publishing is performed asynchronously.

10. The method of claim 1 in which batching queue publishes the cloned data object by delivering the cloned data object to the one or more subscribers.

11. The method of claim 1 in which each of the one or more subscribers comprises a group of listeners and each of the one or more subscribers transmits a reference to the object contained in the batching queue to each listener.

12. The method of claim 1 comprising task scheduling, wherein the data object comprises a task.

13. A non-transitory computer-readable medium comprising instructions configured to be executed by a computer to cause the computer to control the method of claim 1.

14. An autonomous embedded computing system, comprising:

one or more processors;

a memory operably coupled to the one or more processors; and instructions stored in the memory, wherein the instructions are configured to be executed by the computer to cause the computer to control the method of claim 1.

* * * * *